United States Patent
Fukui et al.

(10) Patent No.: US 11,294,611 B2
(45) Date of Patent: Apr. 5, 2022

(54) IMAGE FORMING SYSTEM FOR DESIGNATING EXCEPTION FOR SPECIFIC PAGE AND NON-TRANSITORY COMPUTER READABLE MEDIUM STORING PROGRAM

(71) Applicant: FUJIFILM Business Innovation Corp., Tokyo (JP)

(72) Inventors: Takeshi Fukui, Kanagawa (JP); Shingo Tajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 105 days.

(21) Appl. No.: 16/352,852

(22) Filed: Mar. 14, 2019

(65) Prior Publication Data

US 2019/0317714 A1 Oct. 17, 2019

(30) Foreign Application Priority Data

Apr. 17, 2018 (JP) ............................. JP2018-079108

(51) Int. Cl.
*G06F 3/12* (2006.01)
(52) U.S. Cl.
CPC .......... *G06F 3/1294* (2013.01); *G06F 3/1253* (2013.01); *G06F 3/1274* (2013.01)
(58) Field of Classification Search
None
See application file for complete search history.

(56) References Cited

U.S. PATENT DOCUMENTS

| 9,007,625 B2 | 4/2015 | Morooka |
| 11,048,989 B2 | 6/2021 | Suwabe |
| 2004/0062562 A1* | 4/2004 | Nakatani ............... H04N 1/0097 399/82 |
| 2016/0266854 A1* | 9/2016 | Tonouchi ............... G06F 3/1251 |

FOREIGN PATENT DOCUMENTS

| JP | 2006031479 | 2/2006 |
| JP | 2006270714 | 10/2006 |
| JP | 2012098927 | 5/2012 |
| JP | 2016126071 | 7/2016 |
| JP | 2016181284 | 10/2016 |
| JP | 2016215592 | 12/2016 |

OTHER PUBLICATIONS

Office Action of Japan Counterpart Application, with English translation thereof, dated Dec. 7, 2021, pp. 1-8.

* cited by examiner

*Primary Examiner* — Lennin R Rodriguezgonzalez
(74) *Attorney, Agent, or Firm* — JCIPRNET

(57) ABSTRACT

An image forming system includes an acquisition unit that acquires setting information indicating an execution condition which is set to execute printing from printing instruction information for giving an instruction for execution of the printing, a first designation unit that designates an execution condition which is different from the execution condition related to the setting information acquired from the printing instruction information as an exception for plural specific page images included in the printing instruction information, and a second designation unit that repeatedly designates the exception designated by the first designation unit every number of pages of the plural specific page images for plural page images other than the plural specific page images.

21 Claims, 17 Drawing Sheets

FIG. 1 (FIRST EXEMPLARY EMBODIMENT)

| PAGE | SETTING INFORMATION | | | | CYCLE |
| --- | --- | --- | --- | --- | --- |
| | COLOR MODE | TYPE OF PRINTING MEDIUM | PRINTING SURFACE | ALLOCATION | |
| 1 | COLOR | COATED PAPER | ONE SIDE | 1:1 | 1 |
| 2 | MONOCHROME | PLAIN PAPER | BOTH SIDES | 1:2 | 2 |
| 3 | MONOCHROME | PLAIN PAPER | ONE SIDE | 1:2 | 3 |
| 4 | COLOR | COATED PAPER | ONE SIDE | 1:1 | 1 |
| ⋮ | ⋮ | ⋮ | ⋮ | ⋮ | ⋮ |
| 8 | MONOCHROME | PLAIN PAPER | BOTH SIDES | 1:2 | 2 |
| 9 | MONOCHROME | PLAIN PAPER | ONE SIDE | 1:2 | 3 |
| ⋮ | ⋮ | ⋮ | ⋮ | ⋮ | ⋮ |

FIG. 6A

REPETITION OF EXCEPTION — 7A(7)

☑ DESIGNATE REPETITION OF EXCEPTION — 71

PAGE NUMBER FROM TOP — 72
[ 5 ][ − ][ + ] (1–9999)

[ CANCEL (C) ] [ OK ]

FIG. 6B

REPETITION OF EXCEPTION — 7B(7)

☑ DESIGNATE REPETITION OF EXCEPTION — 71

START PAGE — 73
[ 2 ][ − ][ + ] (1–9999)

END PAGE — 74
[ 5 ][ − ][ + ] (1–9999)

[ CANCEL (C) ] [ OK ]

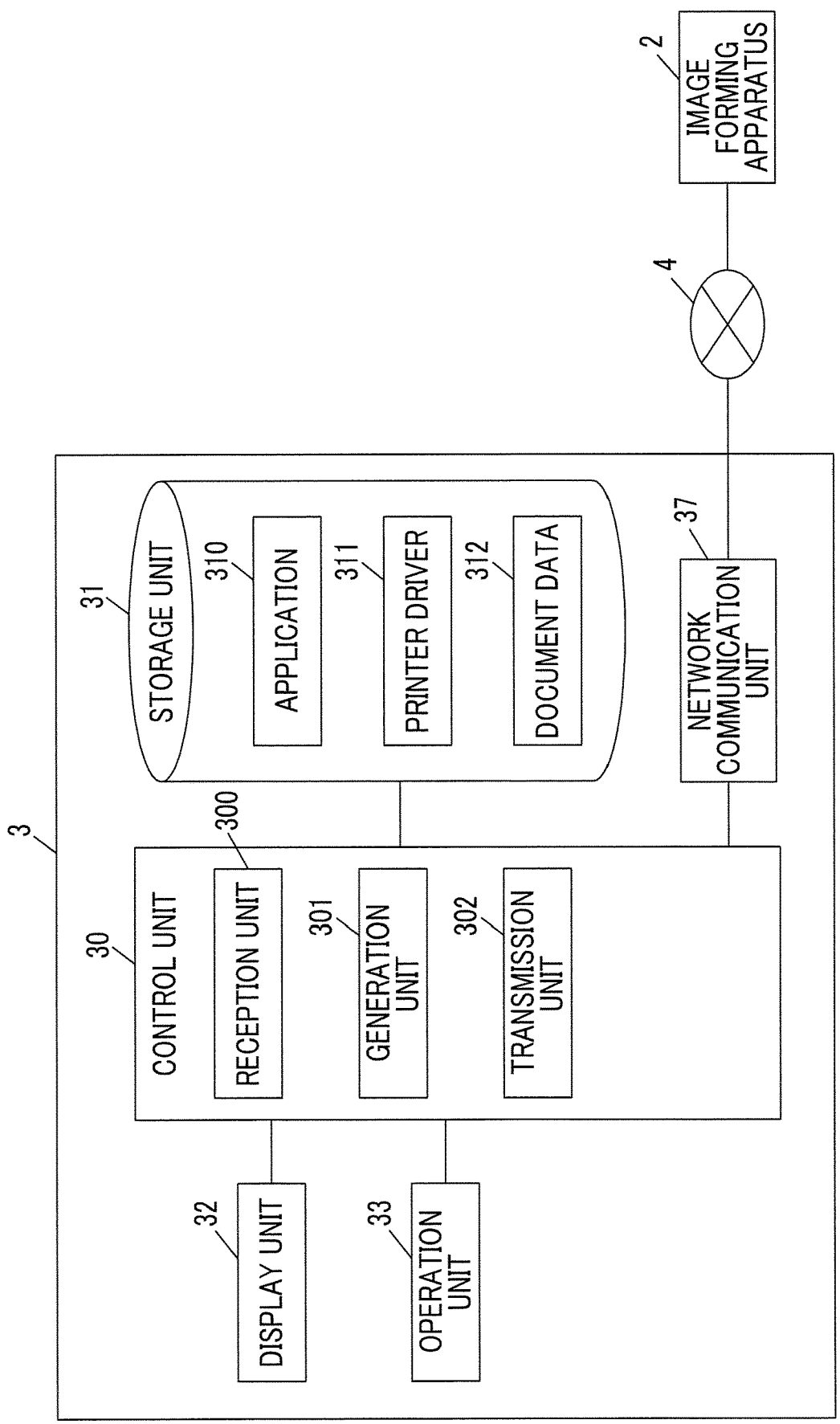

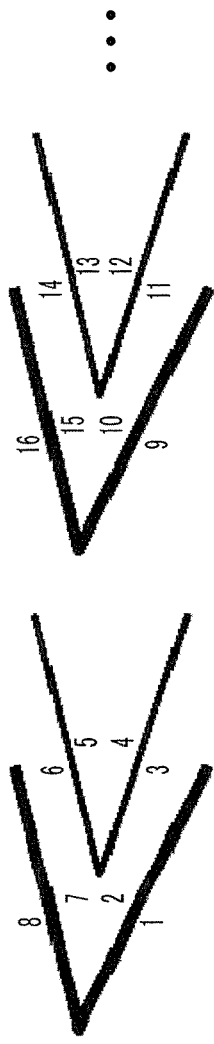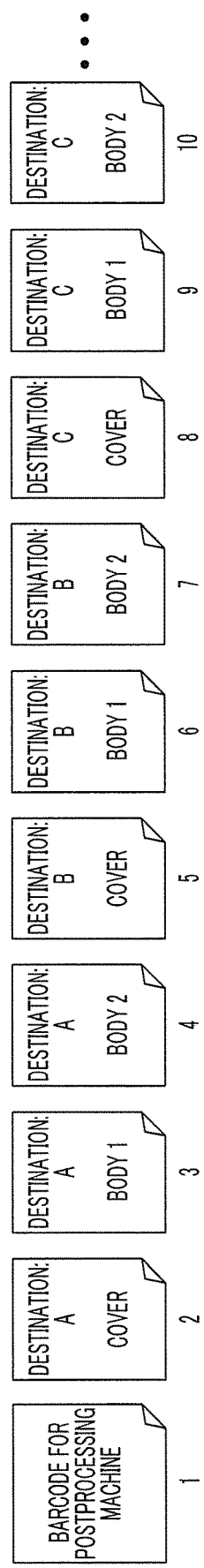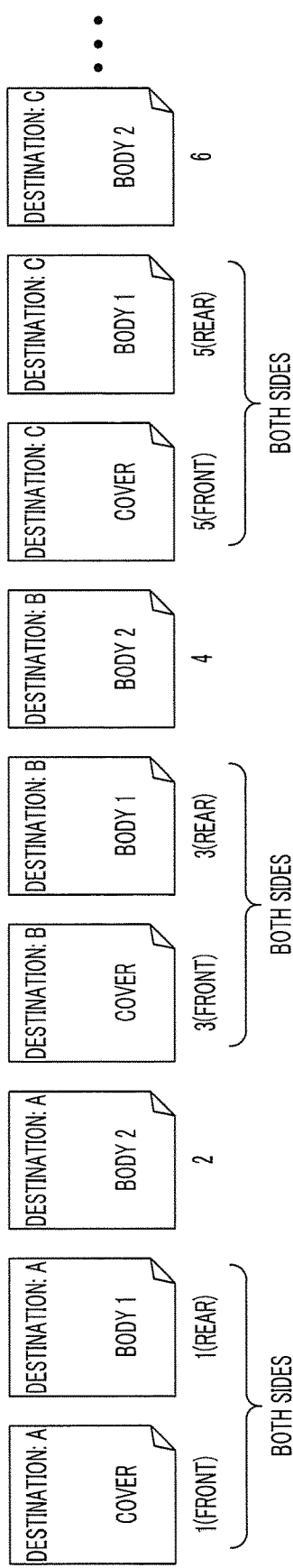

(SECOND EXEMPLARY EMBODIMENT)

IMAGE FORMING SYSTEM FOR DESIGNATING EXCEPTION FOR SPECIFIC PAGE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-079108 filed Apr. 17, 2018.

BACKGROUND

(i) Technical Field

The present invention relates to an image forming system and a non-transitory computer readable medium storing a program.

(ii) Related Art

In recent years, there has been proposed an image forming system including an image forming apparatus which is able to designate an exception for changing an execution condition set in printing instruction information (hereinafter, also referred to as a "printing job") for each page (for example, refer to JP2006-270714A).

The image forming system disclosed JP2006-270714A includes an image processing apparatus provided with a document accumulation unit which accumulates documents; a setting unit which sets a printing mode for the documents accumulated in the document accumulation unit; a document editing unit which edits the documents accumulated in the document accumulation unit and has a white sheet insertion mode in which a white sheet is inserted into the documents as one of document editing modes, a designation unit which designates a white sheet insertion position and a white sheet insertion application in the white sheet insertion mode set by the document editing unit; and a control unit which controls allocation of a white sheet page to the white sheet insertion position on the basis of the printing mode set by the setting unit and the white sheet insertion application designated by the designation unit.

SUMMARY

Aspects of non-limiting embodiments of the present disclosure relate to an image forming system and a non-transitory computer readable medium storing a program capable of also designating an exception to an execution condition designated for a specific page, for other pages repeatedly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system including an acquisition unit that acquires setting information indicating an execution condition which is set to execute printing from printing instruction information for giving an instruction for execution of the printing; a first designation unit that designates an execution condition which is different from the execution condition related to the setting information acquired from the printing instruction information as an exception for a plurality of specific page images included in the printing instruction information; and a second designation unit that repeatedly designates the exception designated by the first designation unit every number of pages of the plurality of specific page images for a plurality of page images other than the plurality of specific page images.

BRIEF DESCRIPTION OF THE DRAWINGS

Exemplary embodiment(s) of the present invention will be described in detail based on the following figures, wherein:

FIGS. 6A and 6B are diagrams illustrating examples of repetition designation screens;

FIG. 9 is a block diagram illustrating an example of a control system of a terminal apparatus illustrated in FIG. 1;

FIGS. 12A to 12F are diagrams for explaining examples of variable printing realized in the exemplary embodiment of the invention;

DETAILED DESCRIPTION

Figure 1:
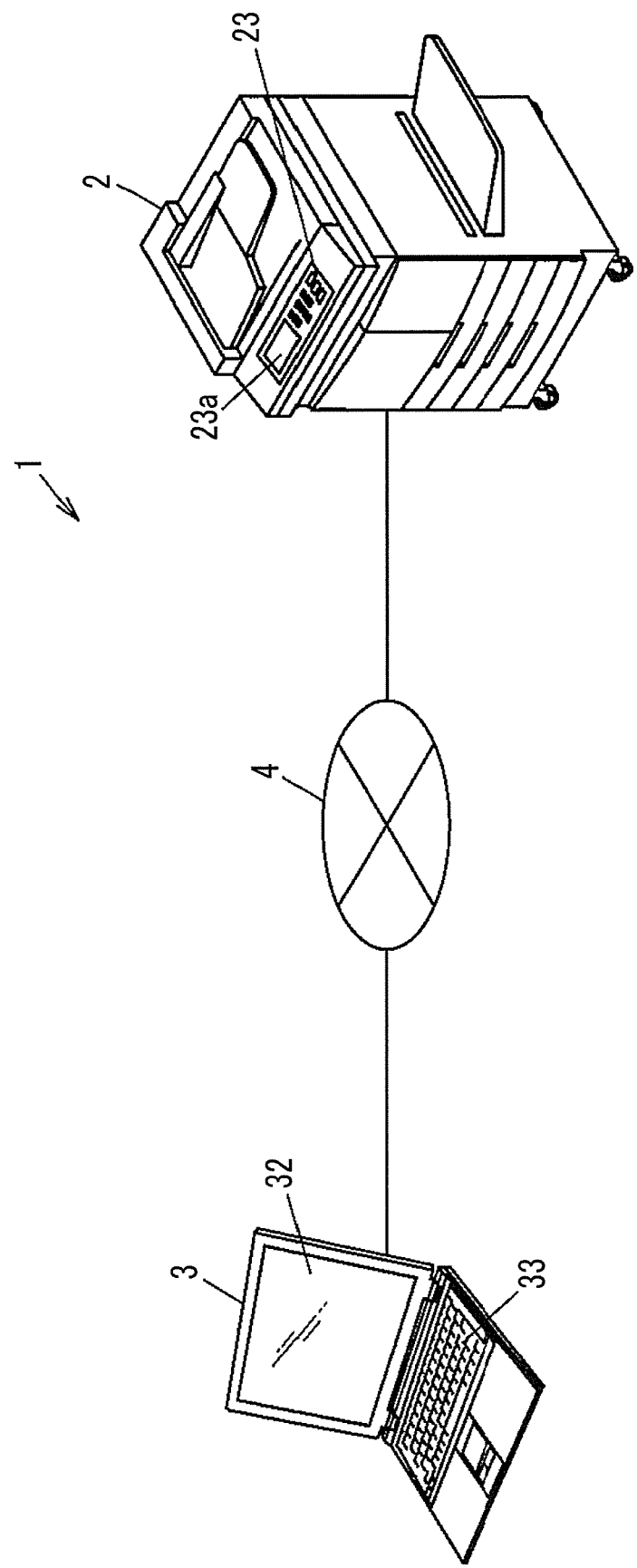
FIG. 1 is a diagram illustrating an example of a configuration of an image forming system according to a first exemplary embodiment of the invention.

Hereinafter, exemplary embodiments of the invention will be described with reference to the drawings. Constituent elements having a substantially identical function are given an identical reference numeral throughout the drawings, and a repeated description will be omitted.

Summary of Exemplary Embodiments

An image forming system according to the present exemplary embodiment includes an acquisition unit that acquires setting information indicating an execution condition which is set to execute printing from printing instruction information for giving an instruction for execution of the printing; a first designation unit that designates an execution condition which is different from the execution condition related to the setting information acquired from the printing instruction information as an exception for a plurality of specific page images included in the printing instruction information; and a second designation unit that repeatedly designates the exception designated by the first designation unit every number of pages of the plurality of specific page images for a plurality of page images other than the plurality of specific page images.

"Designating . . . as an exception for page images" includes not only designating an exception for a page image, such as changing of the type of printing medium but also designating an exception for an execution condition in a case where a page image is printed, such as changing of a color mode.

First Exemplary Embodiment

FIG. 1 is a diagram illustrating an example of a configuration of an image forming system according to a first exemplary embodiment of the invention. An image forming system 1 is configured to include an image forming apparatus 2, and a terminal apparatus 3 connected to the image forming apparatus 2 via a network 4.

The image forming apparatus 2 may be, for example, a multi-function peripheral having a plurality of functions such as a scanning function, a printer function, a copying function, a facsimile function, and an electronic mail function. The image forming apparatus 2 is not limited to a multi-function peripheral as long as a printer function is provided. As illustrated in FIG. 1, the image forming apparatus 2 is provided with an operation unit 23 including an operation display portion 23a which performs input and display of information.

As the terminal apparatus 3, for example, a personal computer, a tablet terminal, or a portable information terminal apparatus such as a multi-function mobile phone (smart phone) may be used.

The network 4 may be, for example, a local area network (LAN), the Internet, an intranet, or a wide area network (WAN), and may be of a wired type, and may be of a wireless type.

Configuration of Image Forming Apparatus 2

Figure 2:
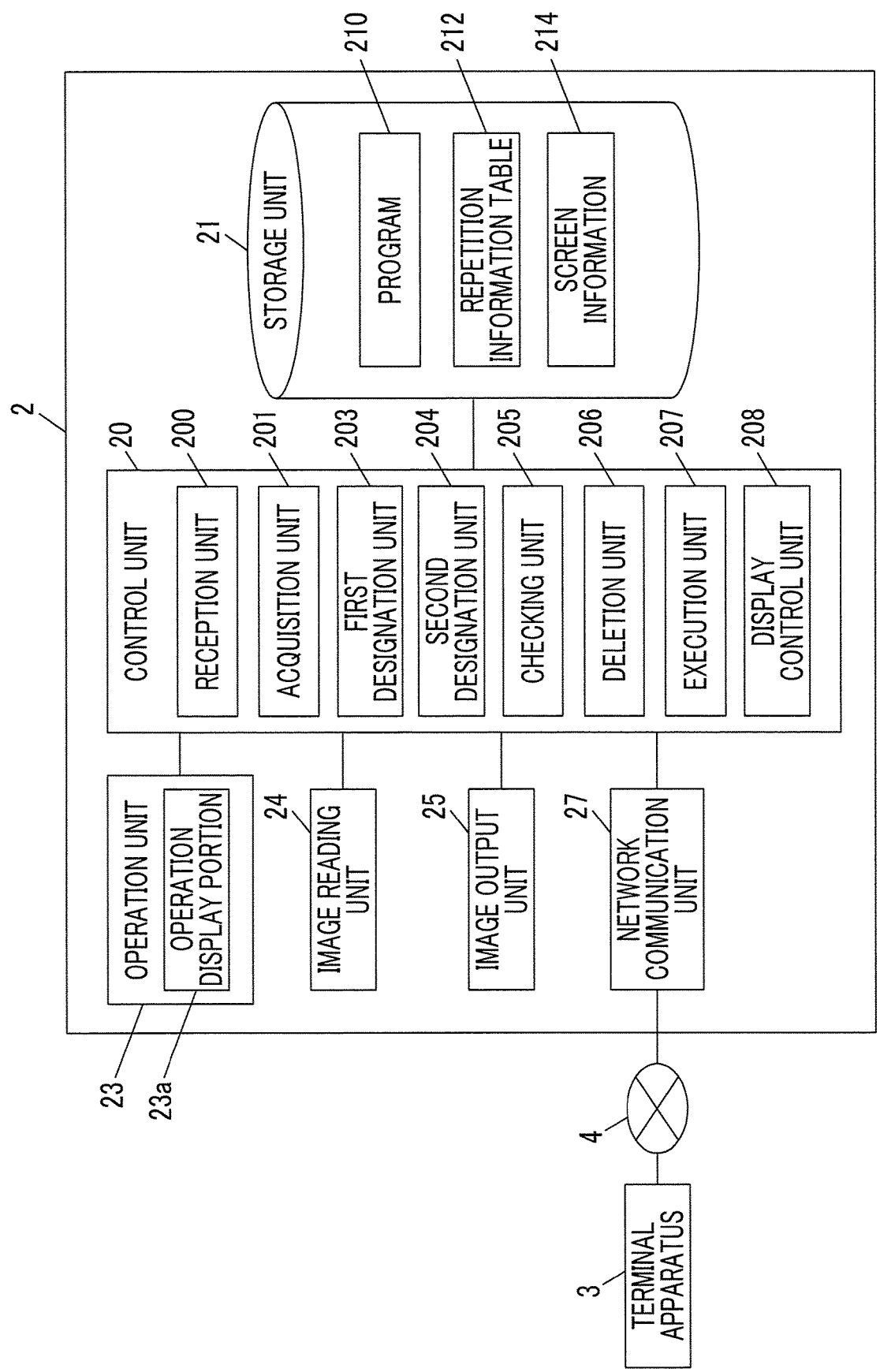
FIG. 2 is a block diagram illustrating an example of a control system of an image forming apparatus illustrated in FIG. 1.

FIG. 2 is a block diagram illustrating an example of a control system of the image forming apparatus 2. The image forming apparatus 2 includes a control unit 20 which controls each unit; a storage unit 21 which stores various pieces of data; the operation unit 23 including the operation display portion 23a; an image reading unit 24 which reads an original document image from an original document; an image output unit which prints and outputs an image; and a network communication unit 27 which performs communication with the terminal apparatus 3 via the network 4.

The control unit 20 is configured with a central processing unit (CPU), an interface, and the like. The CPU is operated according to a program 210 recorded in the storage unit 21, and thus functions as a reception unit 200, an acquisition unit 201, a first designation unit 203, a second designation unit 204, a checking unit 205, a deletion unit 206, an execution unit 207, and a display control unit 208. The display control unit 208 is an example of a warning unit. Details of each of the units 200 to 208 will be described later.

The storage unit 21 is configured with a read only memory (ROM), a random access memory (RAM), and a hard disk, and stores various pieces of data such as a program 210, a repetition information table 212, and screen information 214. Details of the repetition information table 212 and the screen information 214 will be described later.

The operation display portion 23a is, for example, a touch panel display, and has a configuration in which a touch panel is disposed to overlap a display such as a liquid crystal display. The operation display portion 23a may have a configuration in which a display portion and an input portion are provided separately from each other.

The image reading unit 24 reads an original document image from an original document, includes an automatic document feeder (not illustrated) provided on a platen and a scanner, and optically reads an original document image from an original document disposed on the platen or an original document fed by the automatic document feeder.

The image output unit 25 prints and outputs, for example, a color image or a black-and-white (also referred to as "monochrome") image on a printing medium such as printing paper according to an electrophotographic method or an ink jet method.

The network communication unit 27 is realized by a network interface card (NIC) or the like, and transmits and receives signals to and from the terminal apparatus 3 via the network 4.

Various Units 200 to 208

The reception unit 200 receives various pieces of information such as a printing job transmitted from the terminal apparatus 3. The printing job includes printing data (image data) and information (hereinafter, simply referred to as "setting information" in some cases) indicating an execution condition set to execute printing of the printing data. The setting information is also referred to as property (that is, "job property") of the printing job. The job property is an example of attribute information of the printing job.

In a case where the printing data is formed of a plurality of page images, the execution condition set in the printing job is uniformly set in common to the plurality of page images. Hereinafter, a page image will also be simply referred to as a "page" in some cases.

The execution condition includes, for example, items regarding attributes of a printing medium such as a printing surface, imposition, a printing direction, the type of printing medium, a color mode, a size of a printing medium, and a paper feeding tray which feeds a printing medium, and items regarding a discharge destination such as a discharge tray to which a printing medium which is printed and output is discharged.

The printing surface includes a setting value such as duplex or simplex. The printing direction includes, for example, a setting value such as "portrait" indicating a direction in which a long side of an original document is set as a vertical direction, or "landscape" indicating a direction in which a long side of an original document is set as a horizontal direction. The type of printing paper includes a setting value such as coated paper, glossy paper, or plain paper. The color mode includes a setting value such as black-and-white (also referred to as monochrome), a grayscale, or a full color. The size of printing medium includes a setting value indicated by a standard such as A4 or B5, or a setting value indicated by a name of a printing medium such as a "postcard".

The "imposition" indicates that one or more logical pages are disposed at a specific position on a physical page. The physical page indicates a page defined on a printing medium. In the present specification, for convenience of description, when both sides of a printing medium are printed, a front surface and a rear surface are handled as different physical pages, and, when a plurality of logical pages are allocated to a printing medium, respective allocated regions are handled as different physical pages, but the respective allocated regions may be collectively handled as a single physical page.

The logical page indicates a page defined on printing data. The "imposition" includes that a plurality of logical pages are allocated to a single physical page, or that a logical page is disposed in any direction of an upward-and-downward direction and a leftward-and-rightward direction of a physical page. Hereinafter, unless particularly mentioned, a "page" just mentioned is assumed to indicate a physical page.

The acquisition unit 201 acquires setting information from the printing job received by the reception unit 200.

The first designation unit 203 designates an exception to an execution condition for a specific page on the basis of an operation of an operator. The number of specific pages may be one or plural. In a case where there are a plurality of specific pages, an exception is designated in a range of continuous pages, but may be designated in a range of discontinuous pages such as only odd pages or even pages.

The "exception to an execution condition" indicates an execution condition which is different from an execution condition set in a printing job. In other words, the exception to an execution condition indicates a change from the execution condition which is uniformly set for a plurality of pages as attribute information of the printing job. Hereinafter, the exception to an execution condition will be simply referred to as an "exception" in some cases.

The "designation of an exception to an execution condition" indicates that an execution condition which is different from an execution condition set in the printing job is set for a specific page (that is, a differing execution condition is designated as an exception). In other words, the designation of an exception to an execution condition indicates that an execution condition for a specific page is changed in an execution condition related to the setting information acquired by the acquisition unit 201.

The "designation of an exception to an execution condition" includes, for example, a change of the type of printing medium, designation of a position at which lined paper is inserted, and designation of a paper feeding tray or a discharge tray. Here, the printing medium indicates printed matter on which image data which is a printing target is recorded. The printing medium includes, for example, a magazine, a newspaper, a poster, a leaflet, a calendar, a bag, wrapping paper, and an official postcard. The lined paper is a paper medium inserted for sorting printing media, and is paper on which printing is not performed. Hereinafter, the "designation of an exception to an execution condition" will be simply referred to as "designation of an exception" in some cases.

The second designation unit 204 designates a range in which an exception designated by the first designation unit 203 is patterned to be applied to other pages, that is, a cycle (hereinafter, referred to as a "repetition cycle" in some cases) in which designation of the exception is repeated on the basis of an operation of the operator. In other words, the second designation unit 204 repeatedly designates the exception for a plurality of pages other than specific pages for which the exception is designated by the first designation unit 203 every number of pages of the specific pages.

The second designation unit 204 repeatedly designates the exception pattern for pages (for example, pages subsequent to the specific page) other than a specific page for which an exception is designated by the first designation unit 203 in a repetition cycle designated through an operation of the operator.

Figure 3:
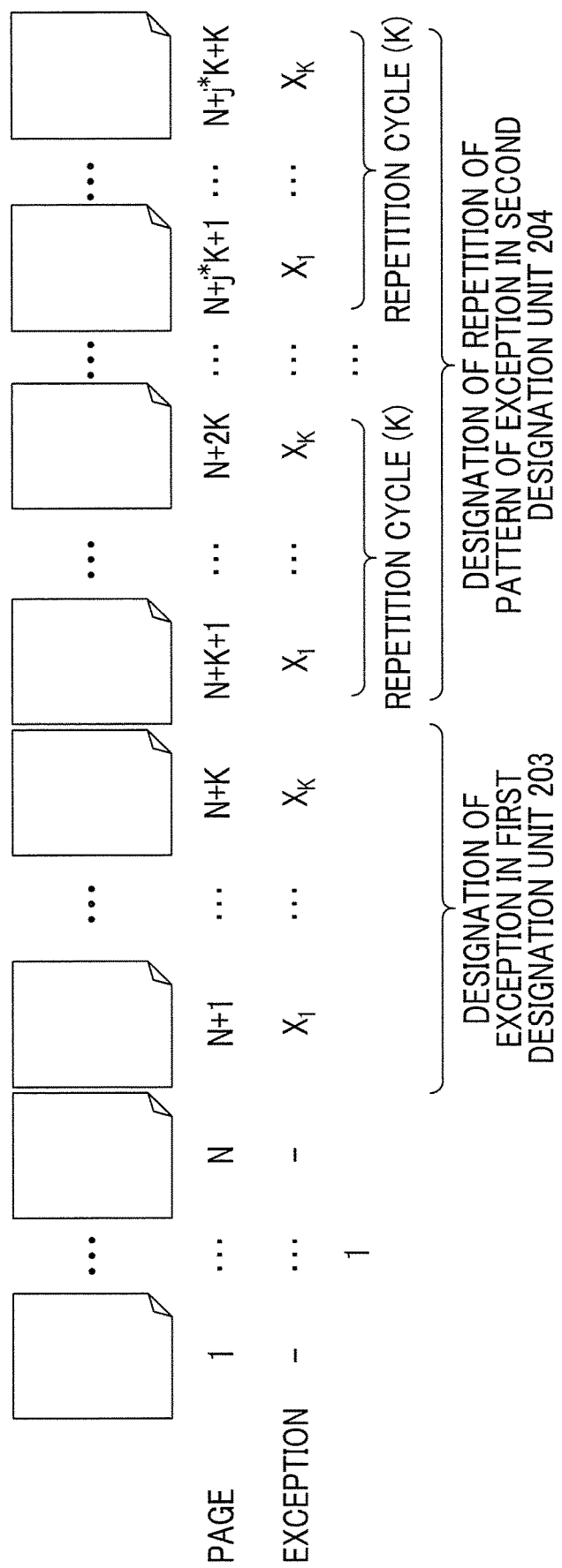
FIG. 3 is a diagram illustrating an example of designation of an exception.

With reference to FIG. 3, a specific example will be described. FIG. 3 is a diagram illustrating an example of designation of an exception. As an example, a description will be made of a case where an exception is designated for an (N+1)-th page, an (N+2)-th page, . . . , and an (N+K)-th page by the first designation unit 203. The (N+1)-th page, the (N+2)-th page, . . . , and the (N+K)-th page are examples of specific pages.

As illustrated in FIG. 3, the first designation unit 203 designates exceptions for the (N+1)-th page, the (N+2)-th page, . . . , and the (N+K)-th page on the basis of an operation of the operator. The reference signs $X_1$ to $X_K$ are symbols for identifying exceptions to an execution condition, defined for convenience of description, and an identical symbol indicates that an exception with an identical content is designated.

Next, the second designation unit 204 designates a repetition cycle on the basis of an operation of the operator. For example, in a case where a repetition cycle is designated as K (pages), the second designation unit 204 repeatedly designates a pattern ($X_1$ to $X_K$) of the exceptions designated for the (N+1)-th page to the (N+K)-th page by the first designation unit 203 in a cycle of K pages from an (N+K+1)-th page corresponding to the next page of the specific page. Here, N, K, and j are natural numbers.

The second designation unit 204 may designate a repetition cycle by designating the number of pages within a range of pages for which a pattern of exceptions is designated, and may designate a repetition cycle by designating a start point and an end point of a range of pages. The start point and the end point of the range of pages may be designated by designating a page (hereinafter, referred to as a "start page" in some cases) at which a repeated pattern of exceptions is started and a page (hereinafter, referred to as an "end page" in some cases) at which the repeated pattern of exceptions is ended. Information regarding an exception designated by the first designation unit 203 and information regarding repetition of the exception designated by the second designation unit 204 will be collectively referred to as "repetition information" in some cases.

The first designation unit 203 records information regarding a designated exception in the repetition information table 212 of the storage unit 21. The second designation unit 204 records information regarding a designated repetition of the exception in the repetition information table 212 of the storage unit 21. In other words, the first designation unit 203 and the second designation unit 204 record repetition information in the repetition information table 212 of the storage unit 21. In the present specification, writing information in a table is referred to as recording the information, and writing information in the storage unit 21 is referred to as storing the information.

The checking unit 205 checks whether or not designation of an exception in the first designation unit 203 and designation of repetition of an exception in the second designation unit 204 are performed on a certain page in duplicate (hereinafter, referred to as "duplicate designation of an exception" in some cases). The checking unit 205 performs warning display even in a case where either designation of an exception in the first designation unit 203 or designation of repetition of an exception in the second designation unit 204 is first performed regardless of an order of the designation.

The case where "designation of an exception in the first designation unit 203 and designation of repetition of an exception in the second designation unit 204 are duplicated" includes, for example, a case where an exception has already been designated by the first designation unit 203 for a page for which repetition of the exception is to be designated before the second designation unit 204 designates repetition of the exception, or a case where the first designation unit 203 designates a new exception for a page for which repetition of an exception is designated after the second designation unit 204 designates the repetition of the exception.

The deletion unit 206 deletes an exception designated by the first designation unit 203 or exceptions repeatedly designated by the second designation unit 204 on the basis of an operation of the operator.

The execution unit 207 executes a function selected by the operator on a screen displayed on the operation display portion 23a. Particularly, the execution unit 207 executes printing output by controlling the image output unit 25 on the basis of information recorded in the repetition information table 212 of the storage unit 21.

The display control unit 208 performs control such that various screens corresponding to the screen information 214 are displayed on the operation display portion 23a of the operation unit 23 by referring to the screen information 214 stored in the storage unit 21. Specifically, the display control unit 208 performs control such that a designation display screen 6 (refer to FIG. 5) including a list of physical page information 65 corresponding to each page is displayed on the operation display portion 23a of the operation unit 23. The display control unit 208 performs control such that the designation display screen 6 is displayed in a predefined display aspect on the basis of designations in the first designation unit 203 and the second designation unit 204. Details of the predefined display aspect will be described later.

Configuration of Repetition Information Table 212

Figure 4:
FIG. 4 is a diagram illustrating an example of a repetition information table.

FIG. 4 is a diagram illustrating an example of the repetition information table 212. Repetition information designated by the first designation unit 203 and the second designation unit 204 is recorded in the repetition information table 212. The repetition information table 212 includes, for example, a "page" field, a "setting information" field, and a "cycle" field.

Number information (hereinafter, also referred to as "page number information") indicating what page corresponds to a target page is recorded in the "page" field. An execution condition is recorded in the "setting information" field in correlation with a page. The execution condition recorded in the "setting information" field includes an execution condition set in a printing job received by the reception unit 200 and exceptions designated by the first designation unit 203 and the second designation unit 204.

The "setting information" field is further provided with, for example, a "color mode" field in which monochrome (for example, two grayscales), a grayscale (for example, 64 or 256 grayscales), and a color are recorded, a "paper type" field in which the type of printing medium such as coated paper or plain paper is recorded, a "printing surface" field in which both sides or one side is recorded, and an "allocation" field in which an allocation method is recorded. The "setting information" field is not limited to such fields, and other fields may be provided as appropriate according to items which are actually settable.

Information indicating a repetition cycle is recorded in the "cycle" field. For example, in a case where an exception is repeatedly designated in a repetition cycle of three pages, "1, 2, 3, 1, 2, 3, . . . " is recorded.

Screen Information 214

Figure 5A:
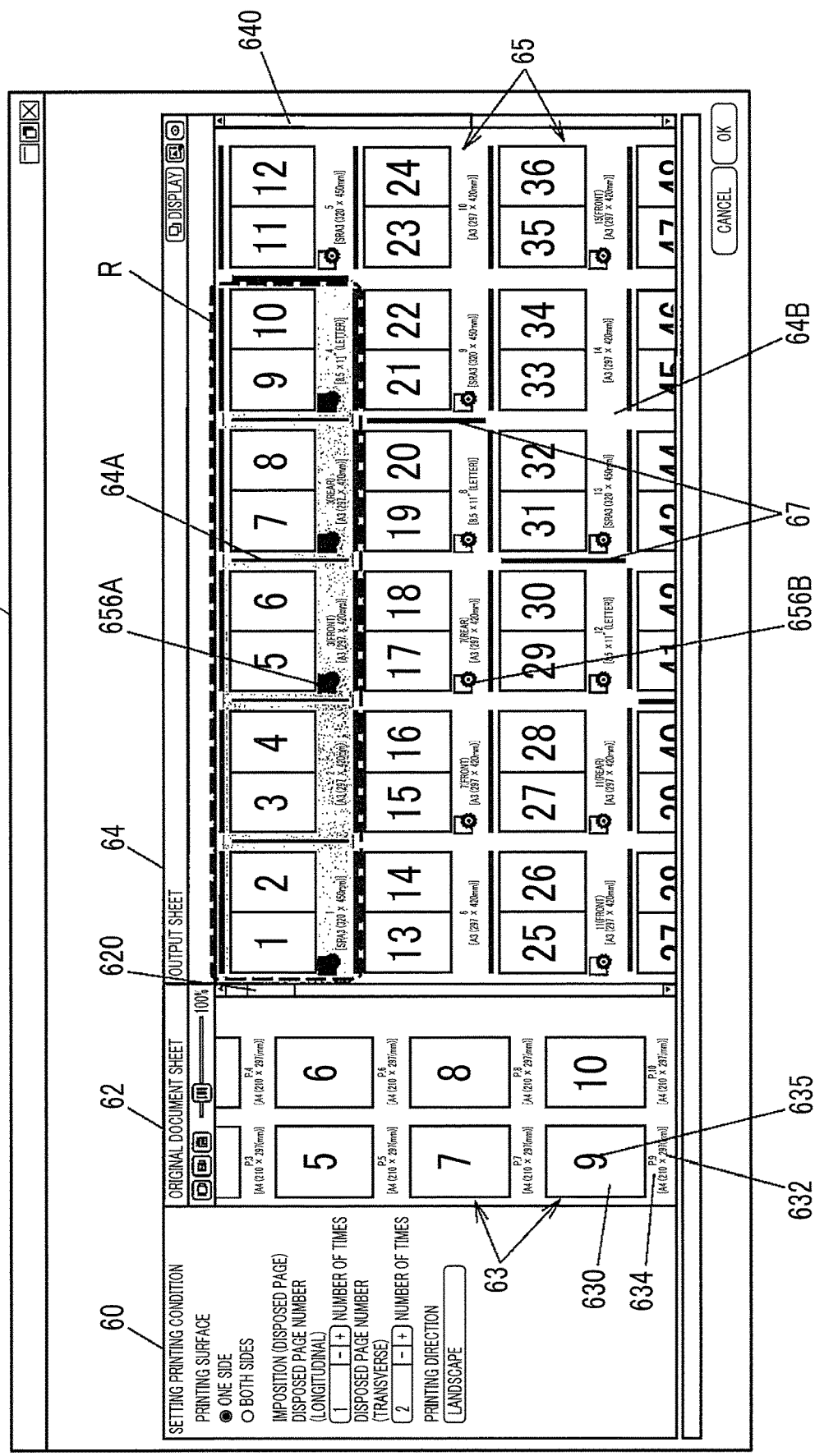
FIG. 5A is a diagram illustrating an example of a designation display screen.

The screen information 214 is information indicating various screens displayed on the operation display portion 23a. With reference to FIGS. 5A to 7, the screen information 214 will be described. FIG. 5A is a diagram illustrating an example of a designation display screen. The designation display screen 6 is a screen which allows the operator to designate an exception to an execution condition and on which a set execution condition is displayed. In the following description, in a case of the term "display", this indicates that the display control unit 208 of the control unit 20 of the image forming apparatus 2 controls the operation display portion 23a of the image forming apparatus 2 to perform display unless otherwise mentioned.

As illustrated in FIG. 5A, the designation display screen 6 includes, for example, an exception designation region 60 for designating an exception to an execution condition, an original document sheet display region 62 displaying each logical page forming an original document which is a printing target, and an output sheet display region 64 visually displaying an execution condition set for each physical page and a state (hereinafter, also referred to as an "output state") of designation of an exception.

In the exception designation region 60, the execution condition may be selected and designated by using a radio button or a pull-down menu. In the original document sheet display region 62, lists of logical page information 63 corresponding to respective logical pages are displayed to be arranged.

The logical page information 63 includes, for example, a logical page icon 630 for identifying a logical page, logical page size information 632 indicating a size of the logical page, and logical page number information 634 indicating what page corresponds to a logical page in printing data. Here, the icon indicates a function configured to include letters, symbols, or graphics (also including a function configured with only letters or symbols).

As illustrated in FIG. 5A, the logical page number information 634 may be indicated by a numerical value image 635 in which a number is drawn. The logical page icon 630 may be indicated by a reduced image (hereinafter, also referred to as a "thumbnail") in which a content of the logical page is reduced and is generated as an image. A first scroll bar 620 which vertically moves and displays the lists of the logical page information 63 may be provided.

Figure 5B:
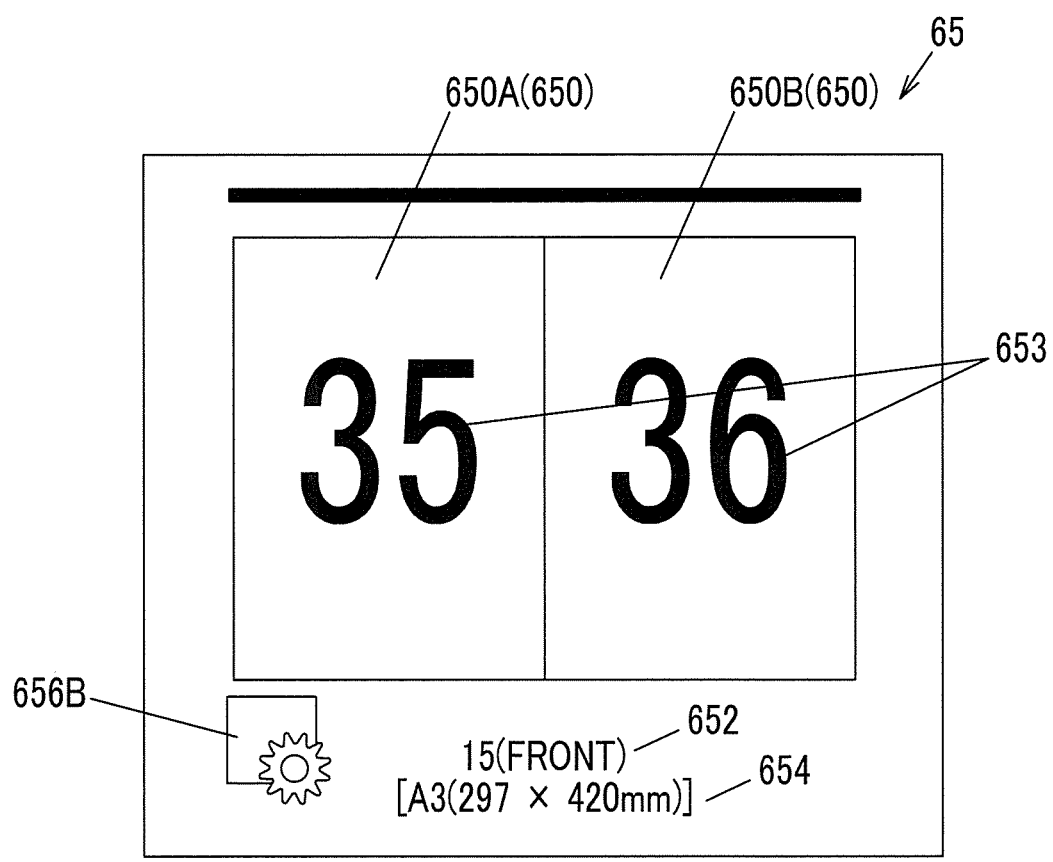
FIG. 5B is a diagram illustrating an extraction of physical page information illustrated in FIG. 5A.

FIG. 5B is a diagram illustrating an extraction of the physical page information illustrated in FIG. 5A. As illustrated in FIG. 5A, lists of a plurality of pieces of physical page information 65 corresponding to respective physical pages are displayed side by side in the output sheet display region 64. The physical page information 65 is an example of a small image.

The physical page information 65 includes a physical page icon 650 indicating an output state of the physical page, number information 652 (hereinafter, also referred to as "physical page number information 652") indicating what page corresponds to the physical page in a printing medium, physical page size information 654 indicating a size of a printing medium, and an exception designation icon 656 indicating whether or not an exception is designated for the physical page. The exception designation icon 656 is an example of image information indicating that an exception is designated.

The physical page information 65 may be displayed in a display aspect in which a range of pages for which exceptions are designated by the first designation unit 203, that is, a range of pages for which exceptions are directly designated through an operation of the operator is identifiable. Specifically, the physical page information 65 related to a page within a range of pages for which exceptions are designated by the first designation unit 203 may be displayed in a display aspect which is different from that of the physical page information 65 related to a page for which an exception is not designated by the first designation unit 203. A case where "an exception is not designated by the first designation unit 203" includes a case where an exception is repeatedly designated by the second designation unit 204.

More specifically, as illustrated in FIG. 5A, a color of a background 64A of the physical page information 65 related to a page within a range of pages (refer to a dashed line frame "R" in FIG. 5A) for which exceptions are designated by the first designation unit 203 may be displayed in a color which is different from that of a background 64B of other physical page information in which repetition is not designated.

In a case where an exception is repeatedly designated by the second designation unit 204, an identification image 67 indicating a boundary between ranges of pages for which exceptions are repeatedly designated may be displayed. Specifically, as illustrated in FIG. 5A, the identification image 67 may be displayed between the physical page information 65 corresponding to an endmost page within one range of pages in a repetition cycle and the physical page information 65 corresponding to an endmost page within another range adjacent to the one range.

In other words, pages related to the physical page information 65 interposed between the adjacent identification images 67 represent that one pattern of an exception is repeatedly designated. The identification image 67 may be an image configured with a horizontally long bar-shaped graphic.

The physical page icon 650 is displayed in a display aspect of visually indicating an output state of each physical page forming a printing medium. As an example, in a case where allocation of allocating two logical pages to a single physical page is set, a single physical page icon 650 is configured to include two partial regions 650A and 6503 respectively corresponding to the two logical pages.

More specifically, as illustrated in FIGS. 5A and 5B, in a case where a total of two logical pages are respectively allocated to the left and the right in a single physical page, the partial regions 650A and 650B indicating the logical pages allocated to the left and the right in the physical page icon 650 are displayed.

For example, the physical page icons 650 may be displayed to be differentiated from each other by a set color mode. Specifically, although not illustrated, in a case where a color mode is set to a color, the physical page icon 650 may be displayed in color, in a case where a color mode is set to a grayscale, the physical page icon 650 may be displayed in grayscale, and, in a case where a color mode is set to monochrome, the physical page icon 650 may be displayed in monochrome.

As illustrated in FIGS. 5A and 5B, the logical page number information 634 (refer to "35" or "36" in FIG. 5B) may be assigned on the physical page icon 650. A second scroll bar 640 which vertically moves and displays the lists of the physical page information 65 may be provided.

The physical page number information 652 is a number assigned to identify a physical page, and corresponds to, for example, a serial number. In a case where both sides are set as a printing surface, the physical page number information 652 may be displayed such that text information (for example, text information such as "front" or "rear") indicating a front surface or a rear surface of a printing medium is further assigned thereto.

As described above, in the present specification, a front surface and a rear surface are handled as different target objects, but, for convenience of description, an identical number is assigned to the rear surface and the front surface with respect to a page number (refer to FIG. 12F). In other words, the physical page number information 652 is information indicating what page corresponds to the physical page in a printing medium. Different numbers may be assigned to a front surface and a rear surface. When allocation is performed, for convenience of description, respective allocated regions are handled as different target objects, and different numbers are assigned thereto (refer to FIG. 12D).

In a case where an exception is designated for a target page, the exception designation icon 656 may be controlled to be assigned to the physical page information 65 so as to be displayed, and, in a case where an exception is not designated for a target page, the exception designation icon 656 may be controlled not to be displayed in the physical page information 65.

The exception designation icon 656 related to a page within a range of pages for which exceptions are designated by the first designation unit 203 (that is, directly designated through an operation of the operator) may be displayed to be differentiated from the exception designation icon 656 related to a page out of the range of pages.

Specifically, an exception designation icon 656A related to a page for which an exception is designated by the first designation unit 203 and an exception designation icon 656B related to a page for which repetition of an exception is designated by the second designation unit 204 may be displayed in different display aspects.

More specifically, the exception designation icon 656A related to a page within the range of pages for which exceptions are designated by the first designation unit 203 may be displayed in a color which is different from a color of the exception designation icon 656B related to a page out of the range. The exception designation icon 656A related to a page within a range of pages for which exceptions are designated by the first designation unit 203 is an example of first image information. The exception designation icon 656B related to a page out of the range is an example of second image information.

FIGS. 6A and 6B are diagrams illustrating examples of repetition designation screens. A repetition designation screen 7 is a screen which allows the operator to designate repetition of an exception. As illustrated in FIG. 6A, a repetition designation screen 7A includes a checkbox 71 for selecting whether or not repetition of an exception is designated, and a range designation field 72 for designating a repetition cycle. The range designation field 72 is a field for inputting a page number (for example, a page number from a top page) within a range of pages for which exceptions are repeatedly designated.

As another example, as illustrated in FIG. 6B, a repetition designation screen 7B may be provided to include a start page designation button 73 for designating a start page and an end page designation button 74 for designating an end page. A start point and an end point of a range of pages for which exceptions are repeatedly designated may be designated on the repetition designation screen 7B.

Figure 7:
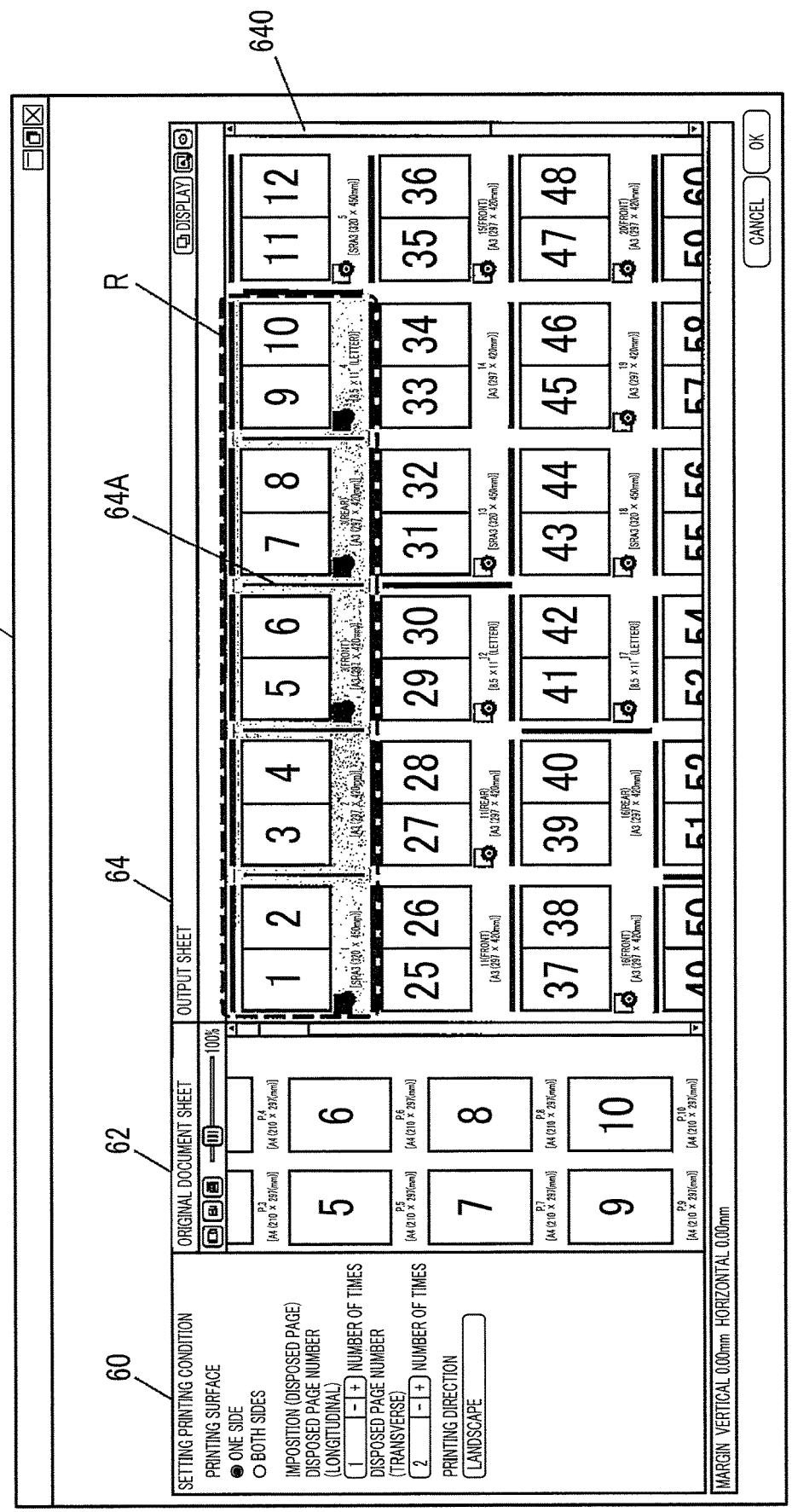
FIG. 7 is a diagram for explaining an example of display when the physical page information illustrated in FIG. 5A is scrolled.

FIG. 7 is a diagram illustrating an example of display when the physical page information 65 illustrated in FIG. 5A is scrolled. In a case where the lists of the physical page information 65 are moved in a downward direction in the drawing by operating the second scroll bar 640, a display position on a screen of the physical page information 65 related to a page within a range (refer to "R" in FIG. 7) in which an exception is designated by the first designation unit 203 may be controlled not to be changed.

In other words, the display control unit 208 may perform control such that, in a case where a plurality of pieces of physical page information 65 are vertically moved by operating the second scroll bar 640, a display position on a screen on which the physical page information 65 corresponding to a page for which an exception is designated by the first designation unit 203 is displayed is fixed, and only the physical page information 65 corresponding to other pages is vertically moved and displayed. The example illustrated in FIG. 7 illustrates a case of vertical scroll, but, in the same manner for a case of horizontal scroll, control may be performed such that a display position on a screen on which the physical page information 65 corresponding to a page for which an exception is designated by the first designation unit 203 is displayed is fixed, and only the physical page information 65 corresponding to other pages is horizontally moved and displayed.

FIGS. 8A to 8D are diagrams illustrating examples of warning screens. A warning screen 8 is a screen including a warning message 80 issuing a warning to the operator in a case where designation of an exception in the first designation unit 203 and designation of repetition of an exception in the second designation unit 204 are performed on a certain page in duplicate.

Figure 8A:
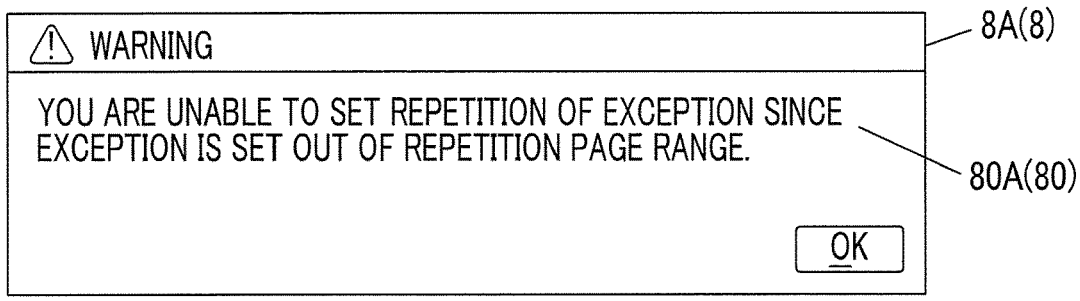
FIGS. 8A to 8D are diagrams illustrating examples of warning screens.

For example, in a case where an exception has already been designated by the first designation unit 203 for a page for which repetition of the exception is to be designated by the second designation unit 204 before the second designation unit 204 designates repetition of the exception, as illustrated in FIG. 8A, a first warning screen 8A including a first warning message 80A indicating that an exception has already been designated by the first designation unit 203 is displayed.

The "case where an exception is designated by the first designation unit 203" may include, for example, a case where an exception is designated for only an odd page, a case where an exception is designated for only an even page, or a case where exceptions are designated for pages within a specific range by using a symbol such as "3- (hyphen)".

Figure 8B:
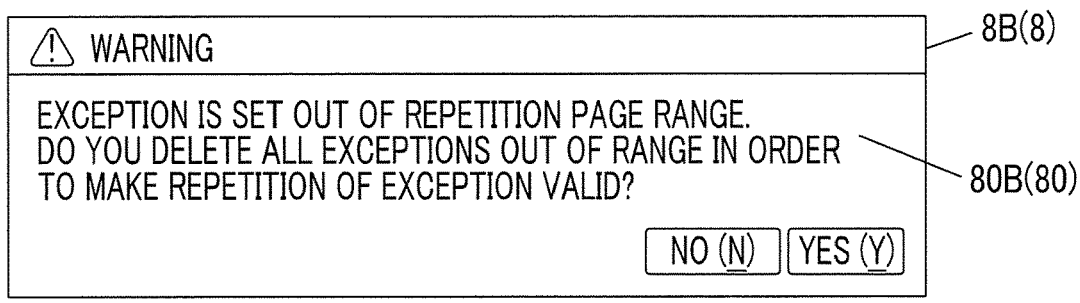

In a case where designation of an exception in the first designation unit 203 and designation of repetition of an exception in the second designation unit 204 are performed on a certain page in duplicate, as illustrated in FIG. 8B, in order to make the designation of repetition of an exception in the second designation unit 204 valid, a second warning screen 8B including a second warning message 80B for selecting whether or not an exception designated by the first designation unit 203 in advance is deleted may be displayed.

Figure 8C:
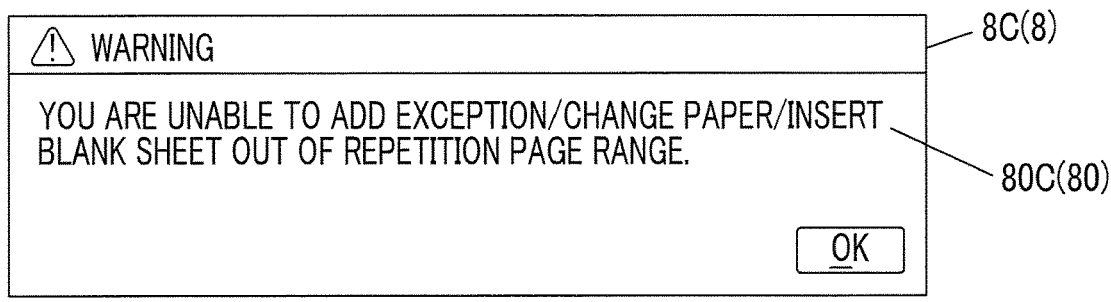
Figure 8D:
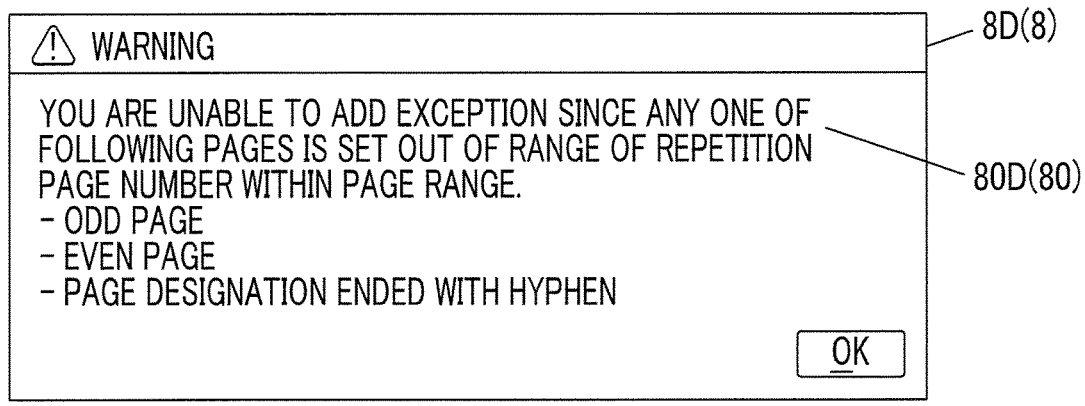

In a case where the first designation unit 203 designates a new exception for a page for which repetition of an exception is designated by the second designation unit 204 after the second designation unit 204 designates the repetition of the exception, as illustrated in FIG. 8C, a third warning screen 8C including a third warning message 80C indicating that the first designation unit 203 is unable to designate an exception is displayed. In this case, as illustrated in FIG. 8D, a fourth warning screen 8D including a fourth warning message 80D including attribute information of a page for which an exception is unable to be designated by the first designation unit 203 may be displayed.

Configuration of Terminal Apparatus 3

FIG. 9 is a block diagram illustrating an example of a control system of the terminal apparatus 3. The terminal apparatus 3 includes a control unit 30 which controls each unit, a storage unit 31 which stores various pieces of data, a display unit 32 which is configured with a liquid crystal display, an operation unit 33 which is realized by a keyboard, a mouse, or the like, and a network communication unit 37 which performs communication with the image forming apparatus 2 via the network 4.

The control unit 30 is configured with a central processing unit (CPU), an interface, and the like. The CPU is operated according to a printer driver 311 stored in the storage unit 31 so as to function as a reception unit 300, a generation unit 301, and a transmission unit 302. Details of the respective units 300 to 302 will be described later.

The storage unit 31 is configured to a read only memory (ROM), a random access memory (RAM), and a hard disk, and stores various pieces of data such as an application 310, the printer driver 311, and document data 312.

The application 310 is, for example, a document creation program, a graphic creation program, or a spreadsheet program. The application 310 creates a document according to an operation of the operator, and forwards document data to the printer driver 311 in a case where the created document is instructed to be printed.

A document created in advance may be stored in the storage unit 31, and may be read from the storage unit 31 so as to be instructed to be printed during printing. A document may be read from the storage unit 31 during editing, and may be instructed to be printed after the editing.

The printer driver 311 converts the document data into printing data described in a page description language (PDL) such as Portable Document Format (PDF) or PostScript (registered trademark) which is able to be analyzed by the image forming apparatus 2, generates a printing job including the printing data and a printing condition, and transmits the printing job to the image forming apparatus 2.

The reception unit 300 receives an operation of the operator which is input from the operation unit 33. The generation unit 301 converts document data into printing data, and generates a printing job including the printing data obtained through conversion and an execution condition. The transmission unit 302 causes the network communication unit 37 to transmit information indicating the operation of the operator received by the reception unit 300 or the printing job generated by the generation unit 301 to the image forming apparatus 2 via the network 4.

Operation in First Exemplary Embodiment

Figure 10:
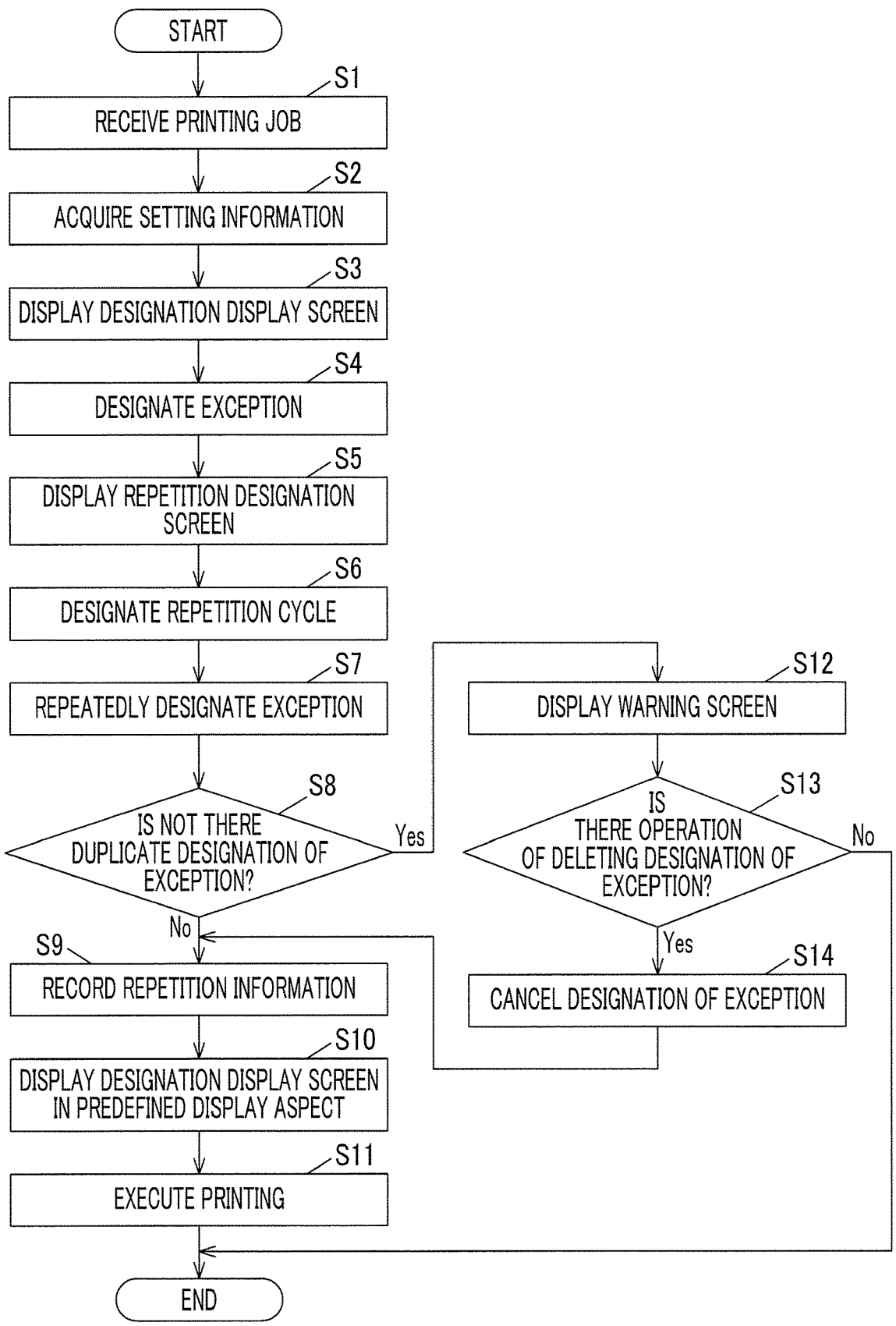
FIG. 10 is a flowchart illustrating an example of an operation of the image forming apparatus according to the first exemplary embodiment.

Next, with reference to FIG. 10, a description will be made of an example of an operation of the image forming apparatus 2. FIG. 10 is a flowchart illustrating an example of an operation of the image forming apparatus 2. The reception unit 200 receives a printing job transmitted from the terminal apparatus 3 (S1). Next, the acquisition unit 201 acquires setting information from the printing job received by the reception unit 200 (S2).

The display control unit 208 performs control such that the designation display screen 6 (refer to FIG. 5A) is displayed on the operation display portion 23a (S3). The first designation unit 203 designates an exception to the execution condition for a specific page on the basis of an operation of the operator on the designation display screen 6 displayed on the operation display portion 23a (S4).

The display control unit 208 performs control such that the repetition designation screen 7 (refer to FIGS. 6A and 6B) is displayed on the operation display portion 23a in response to an operation of the operator (S5). The second designation unit 204 designates a repetition cycle on the basis of an operation of the operator on the repetition designation screen 7 displayed on the operation display portion 23a (S6).

The second designation unit 204 repeatedly designates a pattern of the exception for pages subsequent to the specific page for which the exception is designated by the first designation unit 203 in the designated repetition cycle (S7).

The checking unit 205 checks whether or not designation of an exception in the first designation unit 203 and designation of repetition of an exception in the second designation unit 204 are performed on a certain page subsequent to the specific page in duplicate, that is, there is duplicate designation of an exception (S8). As an example, the checking unit 205 checks whether or not an exception is designated in advance by the first designation unit 203 for a page for which an exception is to be repeatedly designated by the second designation unit 204.

In a case where an exception is not designated in advance by the first designation unit 203 for a page for which an exception is to be repeatedly designated by the second designation unit 204 (S8: No), the first designation unit 203 and the second designation unit 204 records repetition information designated by each thereof in the repetition information table 212 of the storage unit 21 (S9).

The display control unit 208 performs control such that the designation display screen 6 is displayed in a predefined display aspect on the basis of the repetition information designated by the first designation unit 203 and the second designation unit 204 (S10).

Specifically, the display control unit 208 performs control such that the physical page information 65 related to the page for which the exception is designated by the first designation unit 203 or the second designation unit 204 is assigned with the exception designation icon 656 so as to be displayed. The display control unit 208 performs control such that a color of the exception designation icon 656A assigned to the physical page information 65 related to the page for which the exception is designated by the first designation unit 203 is displayed in a color which is different from a color of the exception designation icon 656B assigned to the physical page information 65 related to a page for which the exception is not designated by the first designation unit 203.

The display control unit 208 performs control such that a color of the background 64A of the physical page information 65 related to a page within a range (refer to the dashed line frame "R" in FIG. 5A) of pages for which exceptions are designated by the first designation unit 203 is displayed in a color which is different from a color of the background 64B of the physical page information 65 related to a page out of the range. Control is performed such that the identification image 67 is inserted between the physical page information 65 and the physical page information 65 so as to be displayed in the repetition cycle designated by the second designation unit 204.

The execution unit 207 executes printing by referring to the printing job and the information recorded in the repetition information table 212 of the storage unit 21 on the basis of an operation of the operator giving an instruction for execution of printing (S11).

In a case where an exception is designated in advance by the first designation unit 203 for a page for which an exception is to be repeatedly designated by the second designation unit 204 (S8: Yes), the display control unit 208 performs control such that the warning screen 8 (refer to each of FIGS. 8A to 8D) is displayed on the operation display portion 23a (S12).

In a case where the operator performs an operation of deleting the exception designated in advance by the first designation unit 203 on the second warning screen 8B (refer to FIG. 8B) displayed on the operation display portion 23a (S13: Yes), the deletion unit 206 deletes the designation of the exception (S14).

In this case, since a situation in which designation of the exception is duplicated is removed, the same operation as in the above steps S9 to S11 is performed. In other words, the first designation unit 203 and the second designation unit 204 records repetition information designated by each thereof in the repetition information table 212 (S9), the display control unit 208 performs control such that the designation display screen 6 including the designated repetition information is displayed on the operation display portion 23a (S10), and the execution unit 207 executes printing by referring to the repetition information table 212 on the basis of an instruction from the operator (S11).

Modification Example 1

Figure 11:
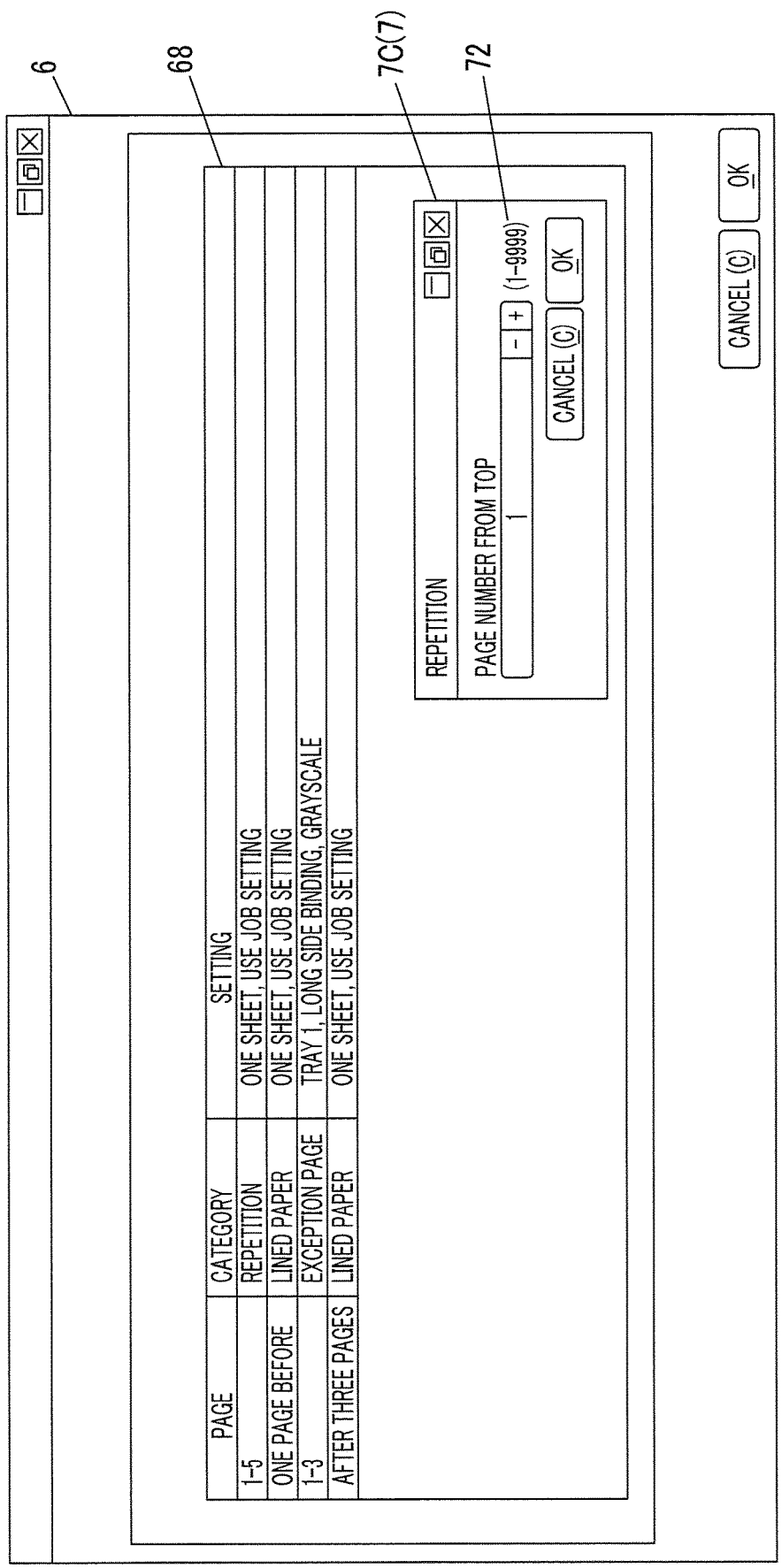
FIG. 11 is a diagram for explaining a designation display screen according to a modification example.

FIG. 11 is a diagram illustrating an example of the designation display screen 6 according to a modification example. A repetition cycle of an exception may be designated by using a table 68 as illustrated in FIG. 11. The table 68 includes, for example, a "page" field, a "category" field, and a "setting" field. The second designation unit 204 may designate a repetition cycle on the basis of an operation of the operator on a repetition designation screen 7C displayed on the operation display portion 23a by the display control unit 208.

Modification Example 2

In the above-described exemplary embodiment, a description has been made of an example of a case where designation of an exception and designation of repetition of an exception are performed on the basis of an operation on the operation display portion 23a of the image forming apparatus 2, but the designation may be performed on the basis of an operation on the operation unit 33 of the terminal apparatus 3.

Specifically, a transmission unit which transmits the screen information 214 to the terminal apparatus 3 via the network 4 may be provided in the control unit 20 of the image forming apparatus 2, and a display control unit may be provided in the control unit 30 of the terminal apparatus 3. In this case, the display control unit of the terminal apparatus 3 may perform control such that the designation display screen 6 or the repetition designation screen 7 is displayed on the display unit 32 of the terminal apparatus 3 on the basis of the screen information 214 transmitted from the image forming apparatus 2, and the operator may operate the designation display screen 6 or the repetition designation screen 7 displayed on the display unit 32 of the terminal apparatus 3 such that the transmission unit 302 of the terminal apparatus 3 transmits repetition information as information related to the operation to the image forming apparatus 2, and thus the repetition information is able to be designated from the terminal apparatus 3. The screen information 214 may be stored in the storage unit 31 of the terminal apparatus 3.

EXAMPLES

Next, with reference to FIGS. 12A to 12F, a description will be made of an example of printing performed in the above-described exemplary embodiment. FIGS. 12A to 12F are diagrams illustrating an example of variable printing realized in the first exemplary embodiment of the invention. The variable printing indicates that a printing form is in common, and printing with different contents is repeatedly performed in a predefined cycle. The variable printing is a single mass repetition printing job such as customer specific bills of a credit card in which a printing form (form information) is in common, but contents (printing data) printed for respective customers are different from each other.

Printing data related to the variable printing is an example of a series of printing data. A range of pages related to repetition will be referred to as a "set" or a "record" in some cases.

Numbers added to each of FIGS. 12A to 12F indicate the physical page number information 652. In the following description, it is assumed that designation in the first designation unit 203 and the second designation unit 204 is performed on the basis of an operation on the designation display screen 6 or the repetition designation screen 7 displayed on the operation display portion 23a of the image forming apparatus 2 by the display control unit 208 unless otherwise mentioned.

Figure 12A:
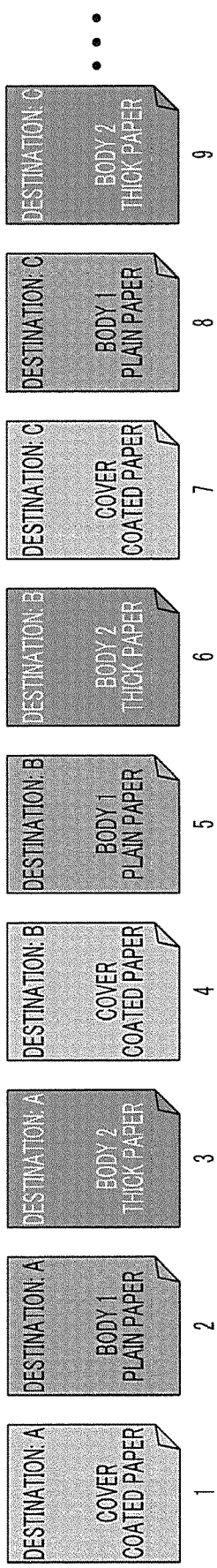

(1) In a Case where a Printing Medium of a Specific Type is used for a Specific Page As illustrated in FIG. 12A, for example, in a case where printing is repeated in a cycle of three pages such that, in a single record, a first page is set to coated paper, a second page is set to plain paper, and a third page is set to thick paper, the first designation unit 203 designates an exception that the type of printing medium of the first page is set to coated paper, the type of printing medium of the second page is set to plain paper, and the type of printing medium of the third page is set to thick paper, and the second designation unit 204 designates a repetition cycle to 3.

In the above-described way, the execution unit 207 can repeatedly execute printing in a cycle of three pages on the basis of the repetition information table 212 such that, in a single record, the first page is set to coated paper, the second page is set to plain paper, and the third page is set to thick paper. In this example, designation of an exception is performed on the basis of the type of printing medium, but there is a case where the type of printing medium stored in each paper feeding tray which stored printing media and feeds a printing medium into the image forming apparatus may be specified in the image forming apparatus 2. In this case, instead of the type of printing medium, designation of an exception may be performed on the basis of the paper feeding tray.

(2) In a Case where a Color Mode of a Specific Page is Changed

Figure 12B:
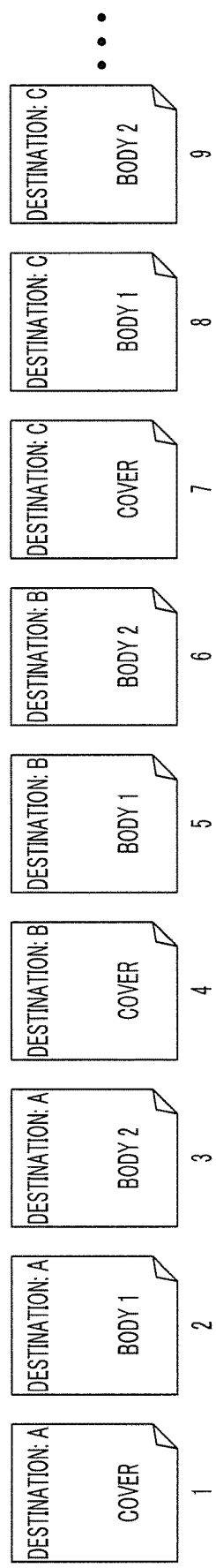

As illustrated in FIG. 12B, for example, in a case where all pages of an original document (printing data) are printed in color, and a first page, a fourth page, a seventh pages, . . . corresponding to covers are printed in color at intervals of three pages, and other pages corresponding to the body are printed in monochrome, the first designation unit 203 designates an exception that a color mode of the first page is set to monochrome, and a color mode of the second page and the third page is set to color, and the second designation unit 204 designates a repetition cycle to 3.

In the above-described way, the execution unit 207 can repeatedly execute printing in a cycle of three pages such that, in a single record, the first page is set to be printed in monochrome, and the second page and the third page are set to be printed in color.

Figure 12C:
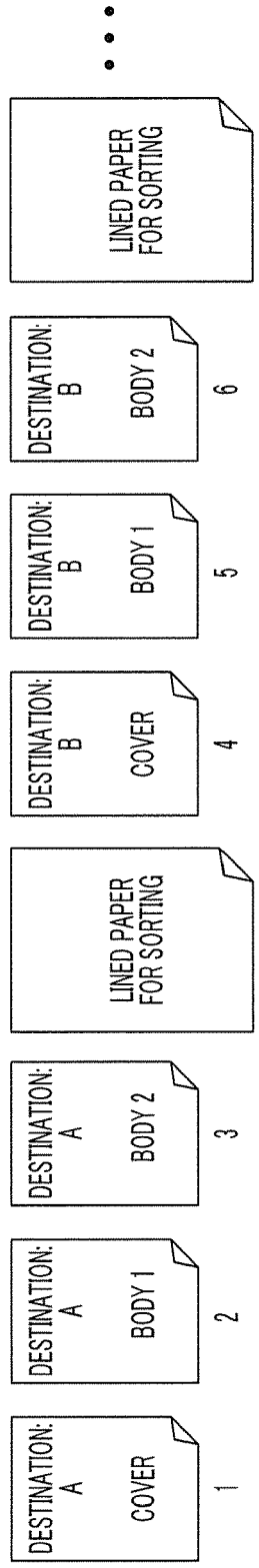

(3) In a Case where a Specific Paper Medium is Inserted at a Predefined Interval As illustrated in FIG. 12C, in a case where lined paper is inserted at intervals of three pages, and repetition printing is performed, the first designation unit 203 designates an exception that a fourth page is set to lined paper, and the second designation unit 204 designates a repetition cycle to 4.

In the above-described way, the execution unit 207 can repeatedly execute printing in a cycle of four pages on the basis of the repetition information table 212 such that, in a single record, the fourth page is set to lined paper. Since printing media are sortable by the lined paper, the sorted printing media other than the lined paper may be subjected to postprocessing in the repetition unit. The postprocessing includes, for example, a process of cutting printing media, a process of folding printing media, a process of forming holes in printing media, and a process of binding printing media.

(4) In a Case of Separate Volumes

A separate volume indicates a created booklet. In the example of a separate volume, for convenience of description, it is assumed that a half of one side of a printing medium is handled as a single physical page.

As illustrated in FIG. 12D, for example, in a case where separate volumes are created by using two printing media, and one of the separate volumes is repeatedly printed by using a printing medium of a specific type, the first designation unit 203 designates an exception that the type of printing medium is set to coated paper, two logical pages are allocated, a printing surface is set to both sides, and imposition is set to a desired setting value, for a first printing medium (refer to a thick line in FIG. 12D), and designates an exception that the type of printing medium is set to plain paper, two logical pages are allocated, a printing surface is set to both sides, and imposition is set to a desired setting value, for a second printing medium (refer to a thin line in FIG. 12D), and the second designation unit 204 designates a repetition cycle to 8.

In the above-described way, the execution unit 207 can repeat printing for forming a booklet configured with a total of eight pages with a first printing medium as coated paper and a second printing medium as plain paper on the basis of the repetition information table 212.

(5) In a Case where only a Predefined Top Page is Excluded from a Variable Printing Target As illustrated in FIG. 12E, for example, in a case where other pages are repeatedly printed except for a top first page on which control information for giving an instruction for a processing content to a postprocessing apparatus is recorded, the second designation unit 204 designates a repetition cycle to 3 by setting a second page as a start page of repetition of an exception and setting a fourth page as an end page of the repetition of the exception.

In the above-described way, the execution unit 207 can repeatedly execute printing in which a single record includes the second page, the third page, and the fourth page except for the first page, in a cycle of three pages on the basis of the repetition information table 212.

(6) In a Case where both Sides are Printed for a Specific Page, and One Side is Printed for other Pages As illustrated in FIG. 12F, for example, in a case where it is repeated that both sides are printed for a first page and a second page, and one side is printed for a third page, the first designation unit 203 designates an exception that a printing surface of the first page and the second page is set to both sides, and a printing surface of the third page is set to one side, and the second designation unit 204 designates a repetition cycle to 3.

In the above-described way, the execution unit 207 can repeatedly execute printing in which, in a single record, the first and the second page are set to both sides, and the third page is set to one side, in a cycle of three pages on the basis of the repetition information table 212.

Second Exemplary Embodiment

Figure 13:
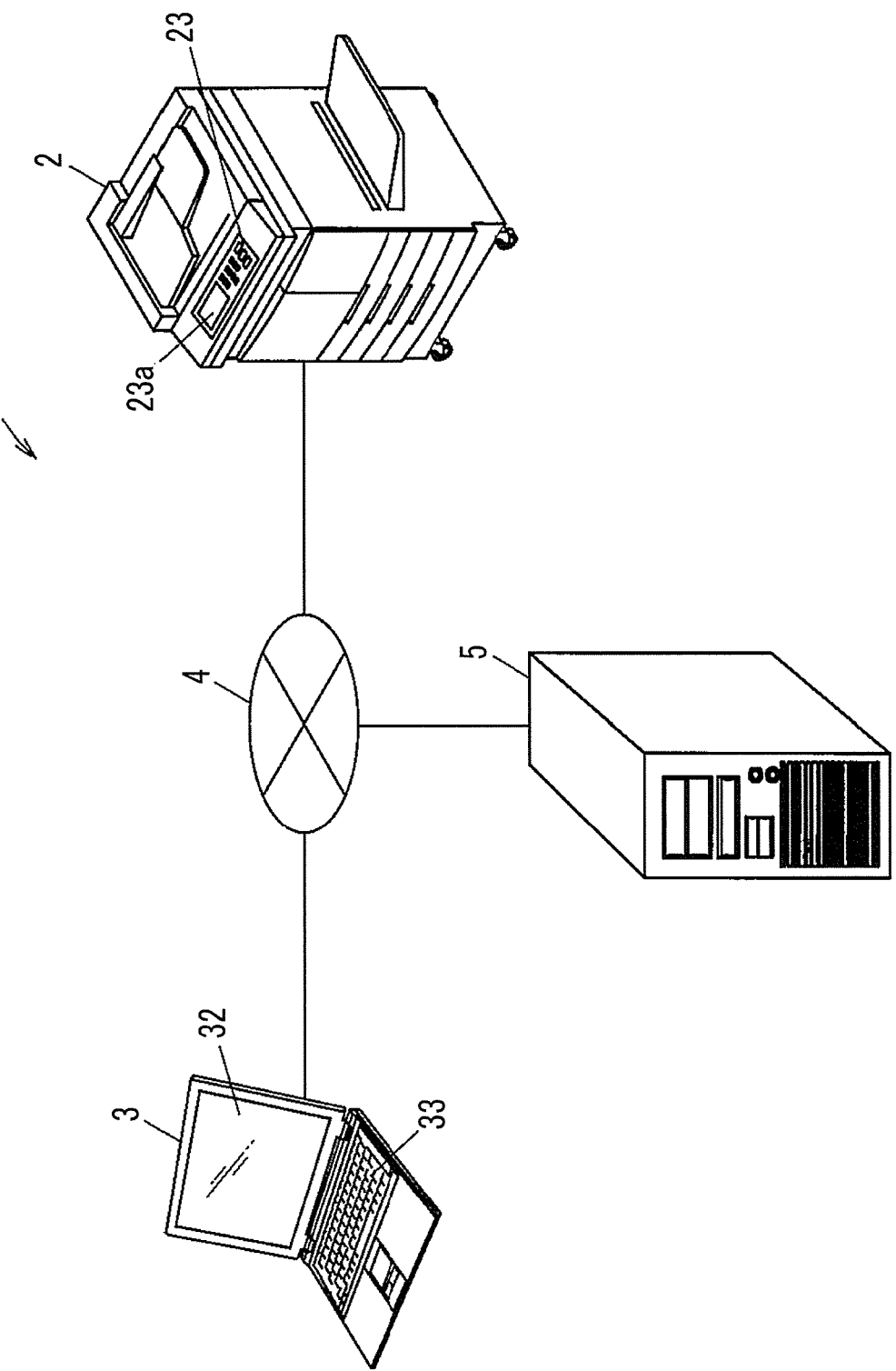
FIG. 13 is a diagram illustrating an example of a configuration of an image forming system 1 according to a second exemplary embodiment of the invention.

Next, a description will be made of a second exemplary embodiment. FIG. 13 is a diagram illustrating an example of a configuration of an image forming system 1 according to a second exemplary embodiment of the invention. The second exemplary embodiment is different from the first exemplary embodiment in that a server apparatus 5 is provided as an information processing apparatus. Hereinafter, an identical reference numeral is given to the substantially same constituent element as in the first exemplary embodiment, repeated description will be omitted, and a difference from the first exemplary embodiment will be focused.

As illustrated in FIG. 13, the image forming system 1 includes the server apparatus 5 in addition to the configuration described in the first exemplary embodiment. The server apparatus 5 is connected to the image forming apparatus 2 and the terminal apparatus 3 via the network 4.

Configuration of Server Apparatus 5

Figure 14:
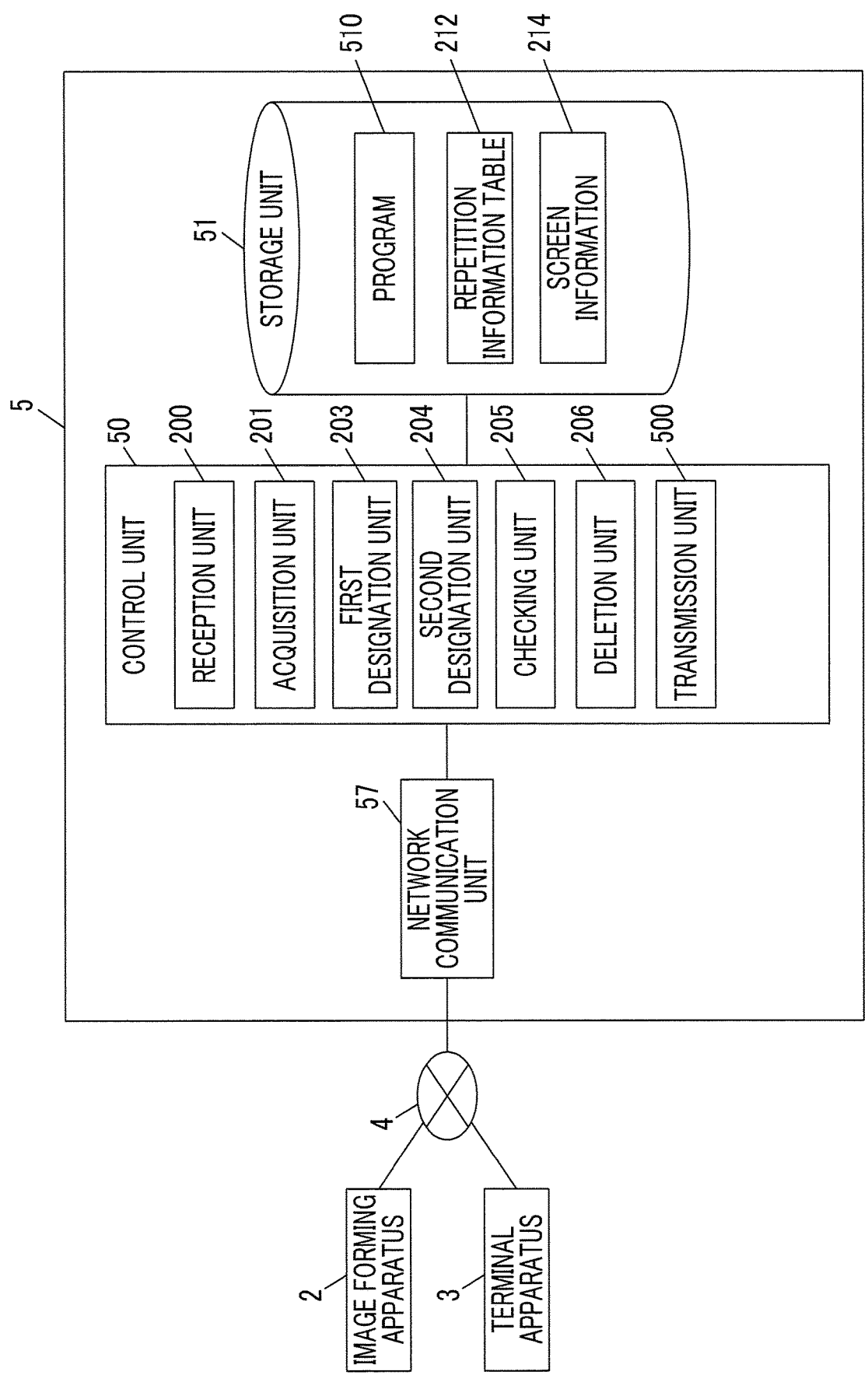
FIG. 14 is a block diagram illustrating an example of a control system of a server apparatus 5.

FIG. 14 is a block diagram illustrating an example of a control system of the server apparatus 5. The server apparatus 5 includes a control unit 50 which controls each unit, a storage unit 51 which stores various pieces of data, and a network communication unit 57 which performs communication with the image forming apparatus 2 and the terminal apparatus 3 via the network 4.

The control unit 50 is configured with a central processing unit (CPU), an interface, and the like. The CPU is operated according to a program 510 recorded in the storage unit 51, and thus functions as a reception unit 200, an acquisition unit 201, a first designation unit 203, a second designation unit 204, a checking unit 205, a deletion unit 206, and a transmission unit 500. Among the units, functions of the reception unit 200, the acquisition unit 201, the first designation unit 203, the second designation unit 204, the checking unit 205, and the deletion unit 206 are the same as the functions of the respective units 200 to 206 described in the first exemplary embodiment, and thus detailed description thereof will be omitted. The transmission unit 500 transmits various pieces of information to the image forming apparatus 2 and the terminal apparatus 3 via the network 4.

The storage unit 21 is configured with a read only memory (ROM), a random access memory (RAM), and a hard disk, and stores various pieces of data such as a program 510, a repetition information table 212, and screen information 214. The repetition information table 212 and the screen information 214 are the same as those described in the first exemplary embodiment, and thus detailed description will be omitted.

Configuration of Image Forming Apparatus 2 and Terminal Apparatus 3

The control unit 20 of the image forming apparatus 2 may not be provided with the acquisition unit 201, the first designation unit 203, the second designation unit 204, the checking unit 205, the deletion unit 206, and the display control unit 208 among the units 200 to 208 described in the first exemplary embodiment. The storage unit 21 of the image forming apparatus 2 may not store the repetition information table 212 and the screen information 214. The control unit 30 of the terminal apparatus 3 further includes a display control unit (not illustrated) performing control such that information is displayed on the display unit 32 in addition to the units described in the first exemplary embodiment.

Operation in Second Exemplary Embodiment

Figure 15:
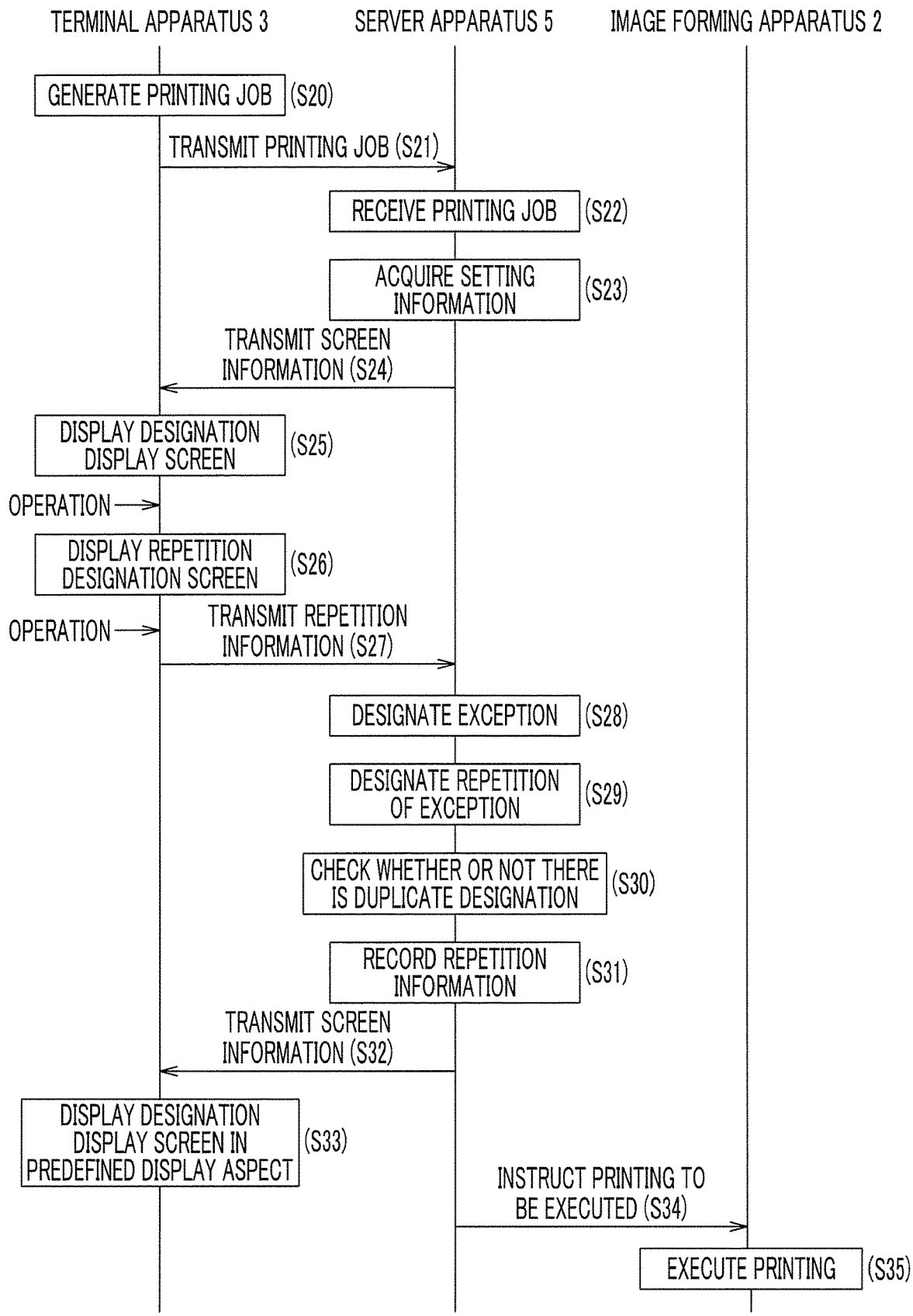
FIG. 15 is a sequence diagram illustrating an example of an operation of the image forming system according to the second exemplary embodiment.

Next, with reference to FIG. 15, a description will be made of an example of an operation of the image forming system 1 according to the second exemplary embodiment. FIG. 15 is a sequence diagram illustrating an example of an operation of the image forming system according to the second exemplary embodiment. The generation unit 301 of the terminal apparatus 3 generates a printing job on the basis of an operation of an operator (S20). The transmission unit 302 of the terminal apparatus 3 transmits the generated printing job to the server apparatus 5 (S21).

The reception unit 200 of the server apparatus 5 receives the printing job transmitted from the terminal apparatus 3 (S22). Next, the acquisition unit 201 of the server apparatus 5 acquires setting information from the printing job received by the reception unit 200 (S23).

The transmission unit 500 of the server apparatus 5 transmits the screen information 214 to the terminal apparatus 3 (S24). The reception unit 300 of the terminal apparatus 3 receives the screen information 214 transmitted from the server apparatus 5. The display control unit of the terminal apparatus 3 performs control such that the designation display screen 6 (refer to FIG. 5A) is displayed on the display unit 32 (S25). The reception unit 300 of the terminal apparatus 3 receives an operation of the operator performed on the designation display screen 6 displayed on the display unit 32 from the operation unit 33.

The display control unit of the terminal apparatus 3 performs control such that the repetition designation screen 7 (refer to FIGS. 6A and 6B) is displayed on the display unit 32 (S26). The reception unit 300 of the terminal apparatus 3 receives an operation of the operator performed on the repetition designation screen 7 displayed on the display unit 32 from the operation unit 33.

The transmission unit 302 of the terminal apparatus 3 transmits repetition information (that is, information regarding an exception and information regarding repetition of the exception) based on the operation to the server apparatus 5

(S27). The reception unit 200 of the server apparatus 5 receives the repetition information transmitted from the terminal apparatus 3.

The first designation unit 203 of the server apparatus 5 designates an exception to an execution condition for a specific page on the basis of the received repetition information (S28). The second designation unit 204 of the server apparatus 5 designates a repetition cycle on the basis of the received repetition information. The second designation unit 204 repeatedly designates a pattern of the exception for a page subsequent to the specific page for which the exception is designated by the first designation unit 203, in the designated repetition cycle (S29).

The checking unit 205 of the server apparatus 5 checks whether or not there is duplicate designation of the exception (S30). In a case where there is no duplicate designation, the first designation unit 203 and the second designation unit 204 records the repetition information in the repetition information table 212 (S31).

The transmission unit 500 of the server apparatus 5 transmits the screen information 214 related to the designation display screen 6 including the repetition information to the terminal apparatus 3 (S32). The reception unit 300 of the terminal apparatus 3 receives the screen information 214 transmitted from the server apparatus 5, and the display control unit 208 of the terminal apparatus 3 performs control such that the designation display screen 6 including the repetition information is displayed on the display unit 32 in a predefined display aspect (S33).

The server apparatus 5 instructs the image forming apparatus 2 to execute printing on the basis of the printing job and the repetition information (S34). The execution unit 207 of the image forming apparatus 2 executes printing on the basis of the instruction from the server apparatus 5 (S35).

Also in the second exemplary embodiment, the Examples illustrated in FIGS. 12A to 12F described in the first exemplary embodiment can be executed. In the second exemplary embodiment, an instruction for repetition of an exception is given by the terminal apparatus 3 (S24 to S27), but may be configured to be executed by the server apparatus 5. In this case, a situation of setting repetition of an exception is not required to be displayed on a screen of the terminal apparatus 3 (S32 to S33), and may be displayed on a screen of the server apparatus 5. The server apparatus 5 may have a so-called controller function of controlling the image forming apparatus 2. As described in the first exemplary embodiment, an instruction for repetition may be given from the operation display portion 23a of the image forming apparatus 2.

As mentioned above, the exemplary embodiments of the invention have been described, but exemplary embodiments of the invention are not limited to the above exemplary embodiments, and may be variously modified within the scope without changing the concept of the invention.

A part or the whole of each unit of the control units 20, 30, and 50 may be configured with a hardware circuit such as a field programmable gate array (FPGA) or an application specific integrated circuit (ASIC).

Some of the constituent elements of the exemplary embodiments may be omitted or changed within the scope without changing the concept of the invention. A step may be added, deleted, changed, and replaced in the flows of the exemplary embodiments without changing the concept of the invention. The program used in the exemplary embodiments may be recorded on a computer readable recording medium such as a CD-ROM so as to be provided, and may be stored in an external server such as a cloud server so as to be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
a processor configured to:
acquire setting information indicating an execution condition which is set to execute printing from printing instruction information for giving an instruction for execution of the printing for a plurality of page images;
designate an execution condition which is different from the execution condition related to the setting information acquired from the printing instruction information as an exception for a first set of plurality of specific page images among the plurality of page images included in the printing instruction information; and
repeatedly designate the exception for every number of pages of the plurality of specific page images for a second set of plurality of page images, among the plurality of page images, other than the first set of plurality of specific page images,
wherein the first set of plurality of specific page images is part of the plurality of page images,
wherein the second set of plurality of specific page images is part of the plurality of page images and a total number of pages of the first set of plurality of specific page images and the second set of plurality of page images is less than a number of pages of the plurality of page images.

2. The image forming system according to claim 1,
wherein the processor is further configured to designate the exception for the specific page images with respect to an attribute of a printing medium.

3. The image forming system according to claim 2,
wherein the processor is further configured to designate an inserted page which is inserted into the specific page images as the exception for the specific page images.

4. The image forming system according to claim 3,
wherein the processor is further configured to designate the exception for the specific page images with respect to a discharge destination which discharges the printing medium on which each of the specific page images is printed.

5. The image forming system according to claim 2,
wherein the processor is further configured to designate the exception for the specific page images with respect to a discharge destination which discharges the printing medium on which each of the specific page images is printed.

6. The image forming system according to claim 2,
wherein the processor is further configured to arrange and display a plurality of small images corresponding to each page image on the basis of the setting information.

7. The image forming system according to claim 1,
wherein the processor is further configured to designate an inserted page which is inserted into the specific page images as the exception for the specific page images.

8. The image forming system according to claim 7,
wherein the processor is further configured to designate the exception for the specific page images with respect to a discharge destination which discharges the printing medium on which each of the specific page images is printed.

9. The image forming system according to claim 1,
wherein the processor is further configured to designate the exception for the specific page images with respect to a discharge destination to which the printing medium on which each of the specific page images is printed is discharged.

10. The image forming system according to claim 1,
wherein the processor is further configured to arrange and display a plurality of small images corresponding to each page image on the basis of the setting information.

11. The image forming system according to claim 10,
wherein the processor is further configured to perform control such that image information indicating that the exception is designated is assigned to the small images corresponding to a page image for which the exception is designated so as to be displayed.

12. The image forming system according to claim 10,
wherein the processor is further configured to perform control such that a range of page images for which the exception is designated is displayed in an identifiable manner.

13. The image forming system according to claim 10,
wherein, in a case where the exception is repeatedly designated, the processor is further configured to perform control such that an identification image indicating a boundary between ranges of page images for which the exception is repeatedly designated is further displayed.

14. The image forming system according to claim 10,
wherein the processor is further configured control such that, when the plurality of small images are moved vertically, display positions at which the small images corresponding to a page image for which the exception is designated are displayed are fixed, and the small images corresponding to other page images are moved and displayed.

15. The image forming system according to claim 11,
wherein, in a case where the image information assigned to the small images corresponding to a page image for which the exception is designated by the processor is set to first image information, and the image information assigned to the small images corresponding to page images for which the exception is repeatedly designated by the processor is set to second image information, the processor is further configured to perform control such that the first image information and the second image information are displayed in different aspects.

16. The image forming system according to claim 1,
wherein the processor is further configured to issue a warning when the exception designated and the exception repeatedly designated are duplicated.

17. The image forming system according to claim 1,
wherein the processor is further configured to designate a start page where repetition of the exception is started.

18. The image forming system according to claim 17,
wherein the processor is further configured to designate an end page where the repetition of the exception is ended.

19. An image forming system comprising:
a processor configured to:
acquire setting information indicating an execution condition which is set to execute variable printing from printing instruction information for giving an instruction for execution of a single piece of the variable printing which is configured by repeatedly using predetermined form information for a series of printing data for a plurality of page images;
designate an execution condition which is different from the execution condition related to the setting information acquired from the printing instruction information as an exception for a specific page image, among the plurality of page images, included in the printing instruction information; and
repeatedly designate a designation range of the exception for a first set of plurality of page images, among the plurality of page images, other than the specific page image,
wherein the specific page image is part of the plurality of page images,
wherein the first set of plurality of page images is part of the plurality of page images and a total number of pages of the specific page images and the first set of plurality of page images is less than a number of pages of the plurality of page images.

20. A non-transitory computer readable medium storing a program causing a computer to:
acquire setting information indicating an execution condition which is set to execute printing from printing instruction information for giving an instruction for execution of the printing for a plurality of page images;
designate an execution condition which is different from the execution condition related to the setting information acquired from the printing instruction information as an exception for a first set of plurality of specific page images, among the plurality of page images, included in the printing instruction information; and
repeatedly designate the exception for every number of pages of the plurality of specific page images for a second set of plurality of page images, among the plurality of page images, other than the first set of plurality of specific page images
wherein the first set of plurality of specific page images is part of the plurality of page images,
wherein the second set of plurality of page images is part of the plurality of page images and a total number of pages of the first set of plurality of specific page images and the second set of plurality of page images is less than a number of pages of the plurality of page images.

21. An image forming system comprising:
a processor configured to:
acquire setting information indicating an execution condition which is set to execute printing from printing instruction information for giving an instruction for execution of the printing;
designate an execution condition which is different from the execution condition related to the setting information acquired from the printing instruction information as an exception for a plurality of specific page image included in the printing instruction information;

repeatedly designate the exception for every number of pages of the plurality of specific page images for a plurality of page images other than the plurality of specific page images; and issue a warning when the exception designated and the exception repeatedly designated are duplicated.

* * * * *